Figure 1:
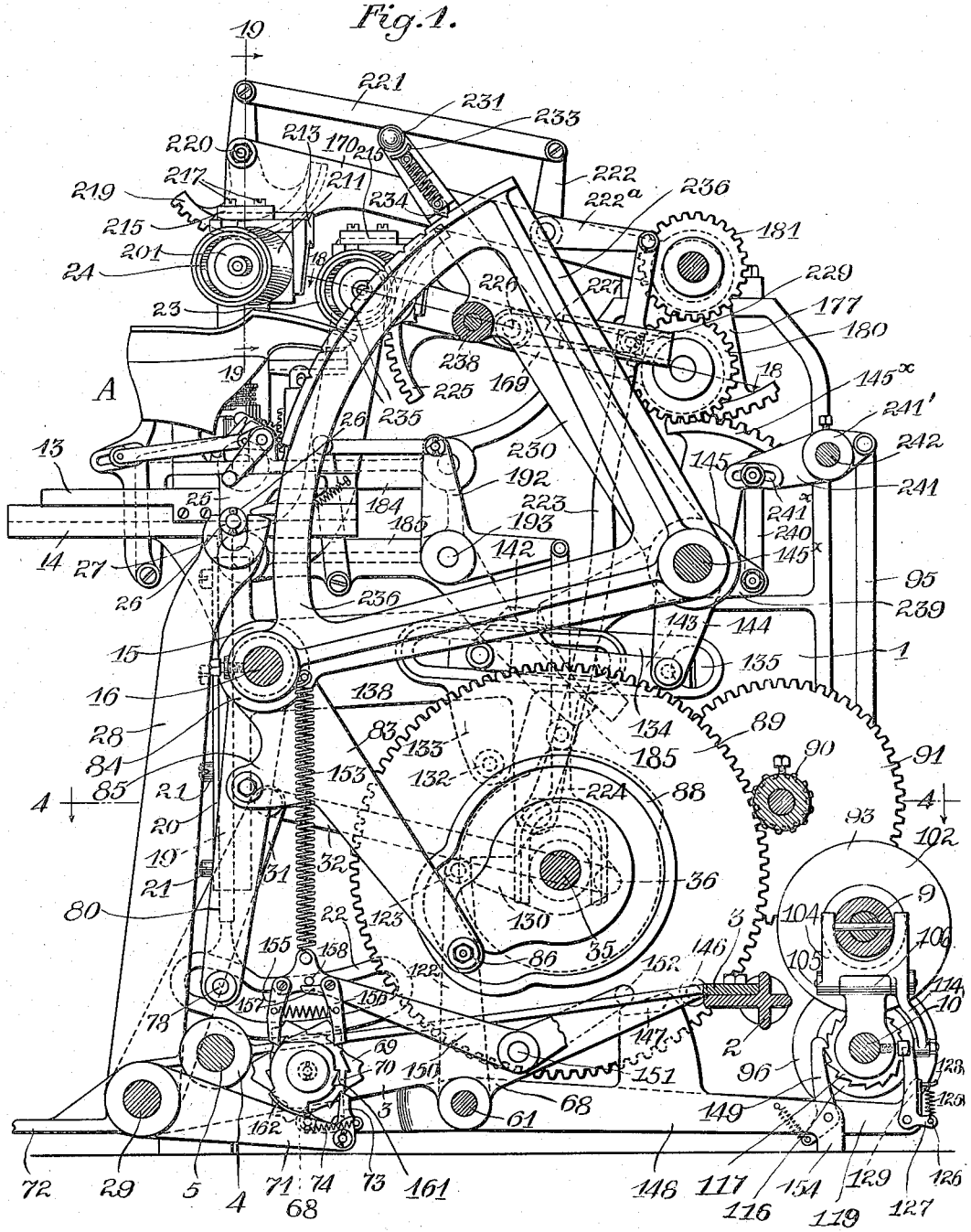

E. WOODWARD.
AUTOMATIC LEVELER.
APPLICATION FILED SEPT. 7, 1906. RENEWED MAR. 23, 1909.

939,372.

Patented Nov. 9, 1909.
12 SHEETS—SHEET 1.

Witnesses:
Archie B. Colbath.
Sydney C. Taft.

Inventor:
Erastus Woodward,
by Emery & Booth,
Attys.

E. WOODWARD.
AUTOMATIC LEVELER.
APPLICATION FILED SEPT. 7, 1906. RENEWED MAR. 23, 1909.

939,372.

Patented Nov. 9, 1909.
12 SHEETS—SHEET 2.

Witnesses:
Archie R. Colbath.
Sydney C. Taft.

Inventor:
Erastus Woodward,
by Emery & Booth,
Attys.

E. WOODWARD.
AUTOMATIC LEVELER.
APPLICATION FILED SEPT. 7, 1906. RENEWED MAR. 23, 1909.

939,372.

Patented Nov. 9, 1909.
12 SHEETS—SHEET 6.

Witnesses:
Archie P. Colbath.
Sydney C. Taft.

Inventor:
Erastus Woodward,
by Emery & Booth,
Attys.

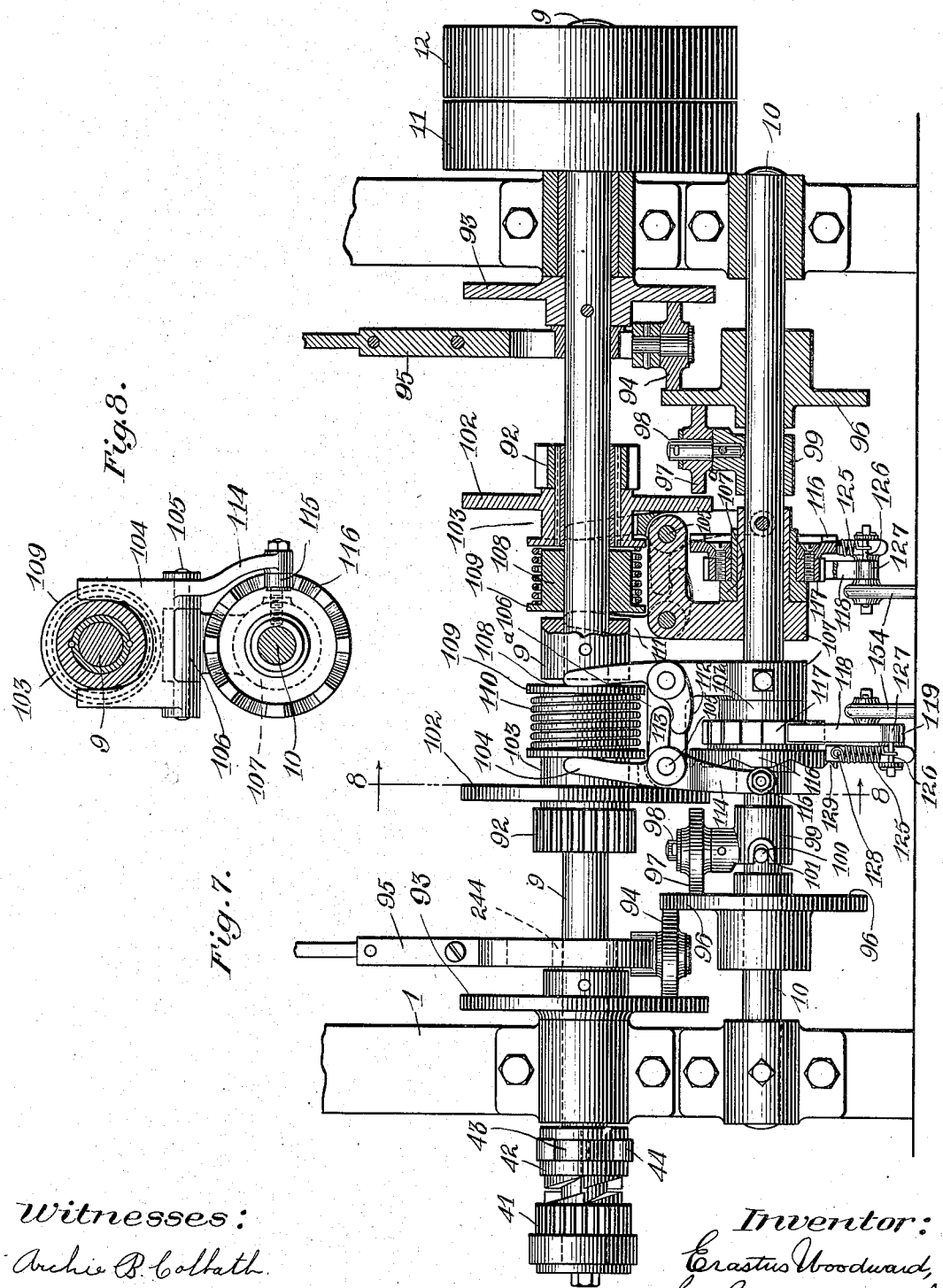

E. WOODWARD.
AUTOMATIC LEVELER.
APPLICATION FILED SEPT. 7, 1906. RENEWED MAR. 23, 1909.
939,372.
Patented Nov. 9, 1909.
12 SHEETS—SHEET 8.
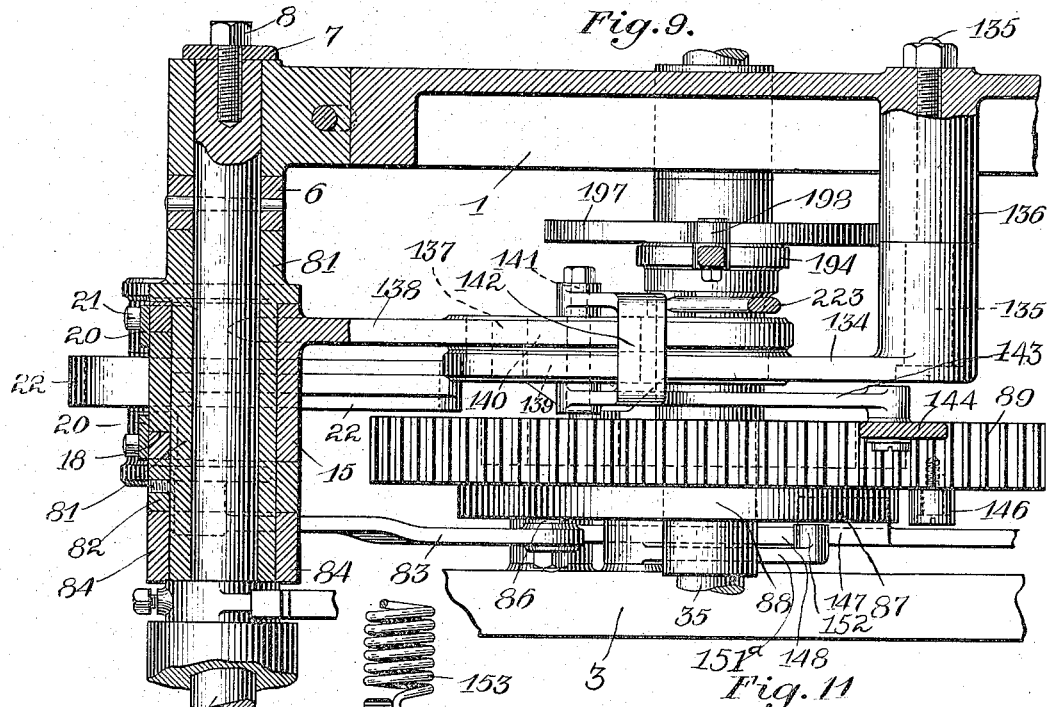
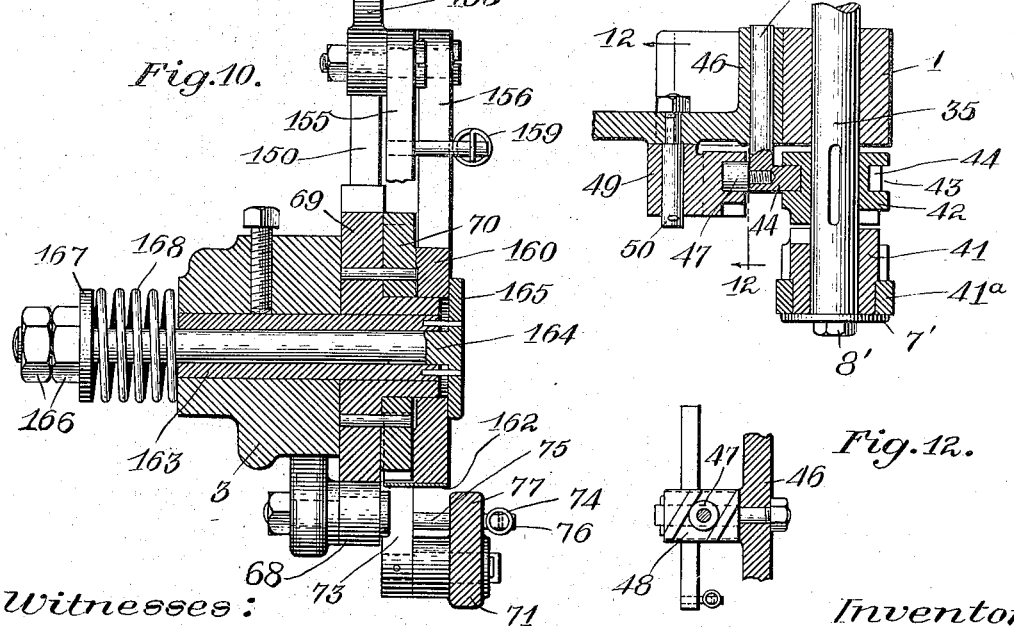
Witnesses:
Archie B. Colbath.
Sydney E. Taft.
Inventor
Erastus Woodward,
by Emery Booth,
Attys.

E. WOODWARD.
AUTOMATIC LEVELER.
APPLICATION FILED SEPT. 7, 1906. RENEWED MAR. 23, 1909.

939,372.

Patented Nov. 9, 1909.
12 SHEETS—SHEET 9.

Witnesses:
Archie B. Colbath.
Sydney C. Taft.

Inventor:
Erastus Woodward,
by Emery Booth,
Attys.

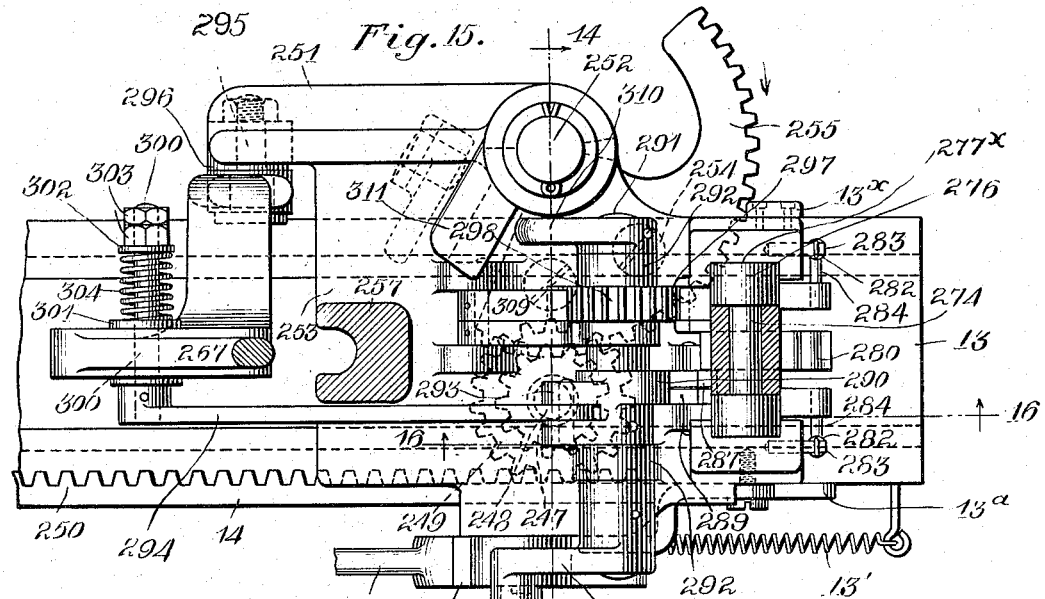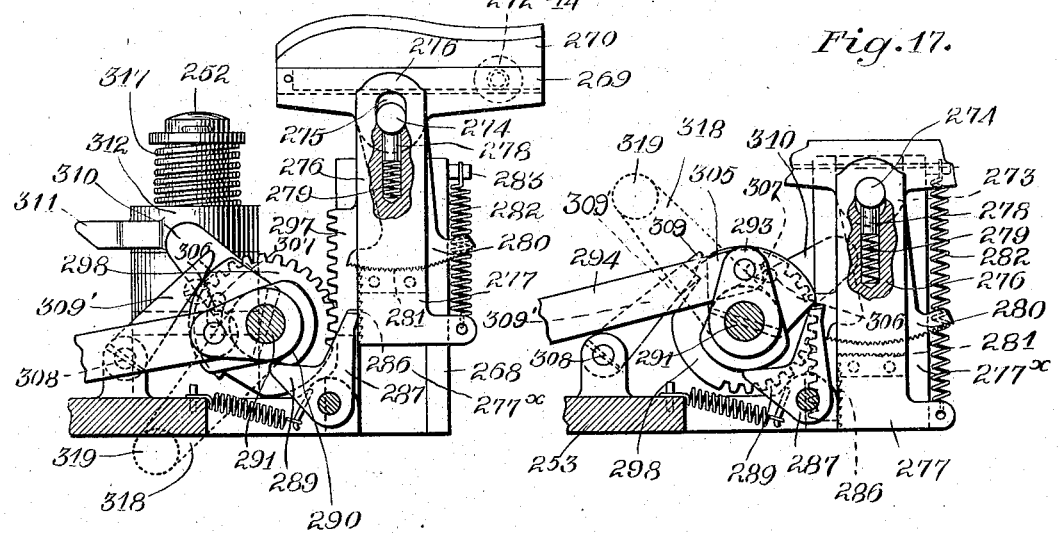

E. WOODWARD.
AUTOMATIC LEVELER.
APPLICATION FILED SEPT. 7, 1906. RENEWED MAR. 23, 1909.
939,372.
Patented Nov. 9, 1909.
12 SHEETS—SHEET 11.
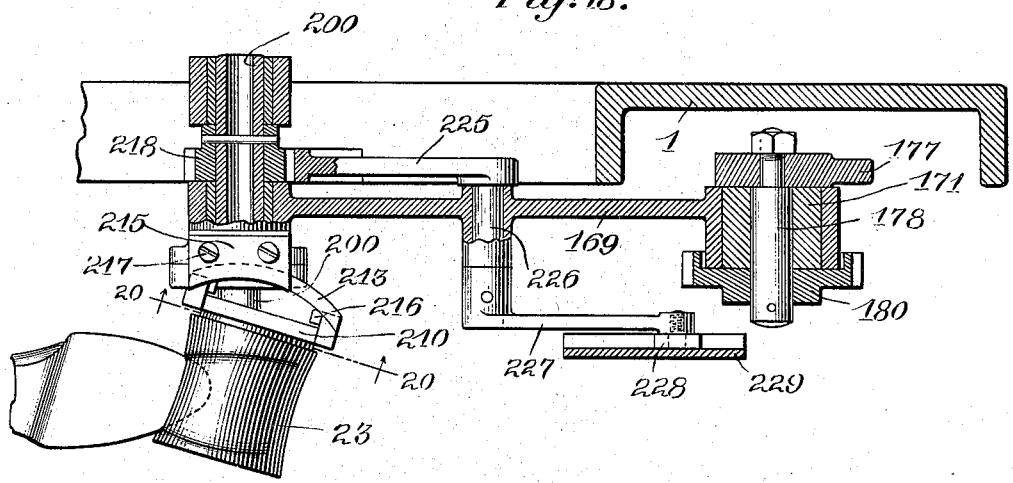
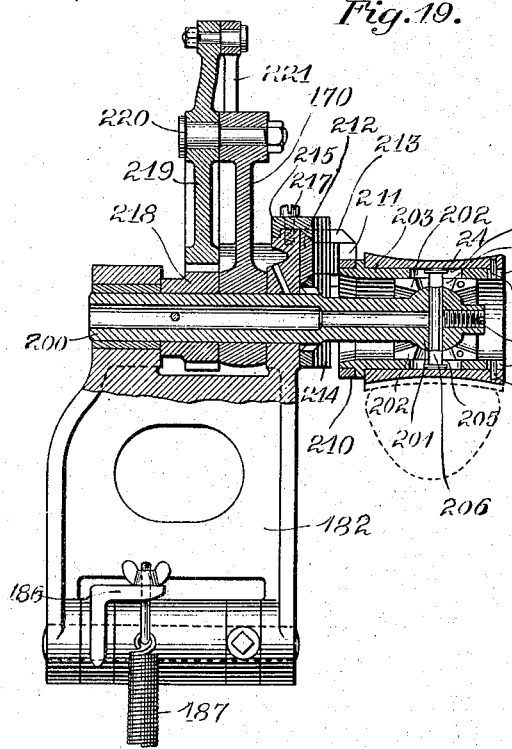
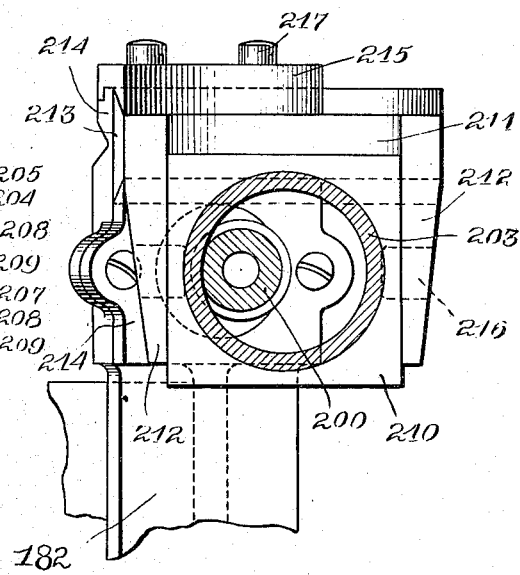
Witnesses:
Archie B. Colbath
Sydney E. Taft
Inventor:
Erastus Woodward
by Emery & Booth,
Attys.

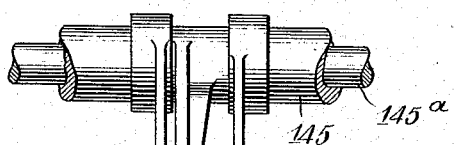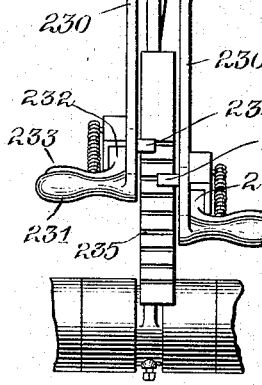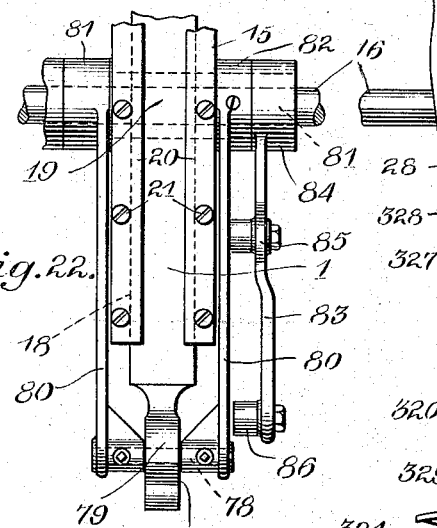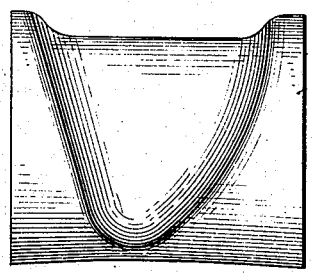

UNITED STATES PATENT OFFICE.

ERASTUS WOODWARD, OF SOMERVILLE, MASSACHUSETTS, ASSIGNOR, BY MESNE ASSIGNMENTS, TO THOMAS G. PLANT, OF BOSTON, MASSACHUSETTS.

AUTOMATIC LEVELER.

939,372. Specification of Letters Patent. Patented Nov. 9, 1909.

Application filed September 7, 1906, Serial No. 333,611. Renewed March 23, 1909. Serial No. 485,233.

*To all whom it may concern:*

Be it known that I, ERASTUS WOODWARD, a citizen of the United States, residing at Somerville, in the county of Middlesex and State of Massachusetts, have invented an Improvement in Automatic Levelers, of which the following description, in connection with the accompanying drawings, is a specification, like characters on the drawings representing like parts.

My invention relates to machines for molding, shaping or laying the soles of shoes, more particularly to such as are provided with vibratory forms and moving jacks.

The object of my invention is generally to provide an improved machine of the type referred to, one that will facilitate the operation of laying or leveling shoe soles, so that an operative can properly handle the same, adjust or adapt it for use upon soles of different sizes and styles and obtain the best results.

One feature of my invention resides in means for producing laying or leveling movements and adjustments of the former or molds and also of the jack by which the machine is particularly adapted to lay or level the soles of the different sizes and styles of shoes and to produce superior work.

All of the above, however, with other novel and useful features of construction and operation, will be best understood and appreciated from the following description, when taken in connection with the accompanying drawings, of a machine embodying one form of my invention and selected for purposes of illustration, it's scope being more particularly pointed out in the appended claims.

Figure 2:
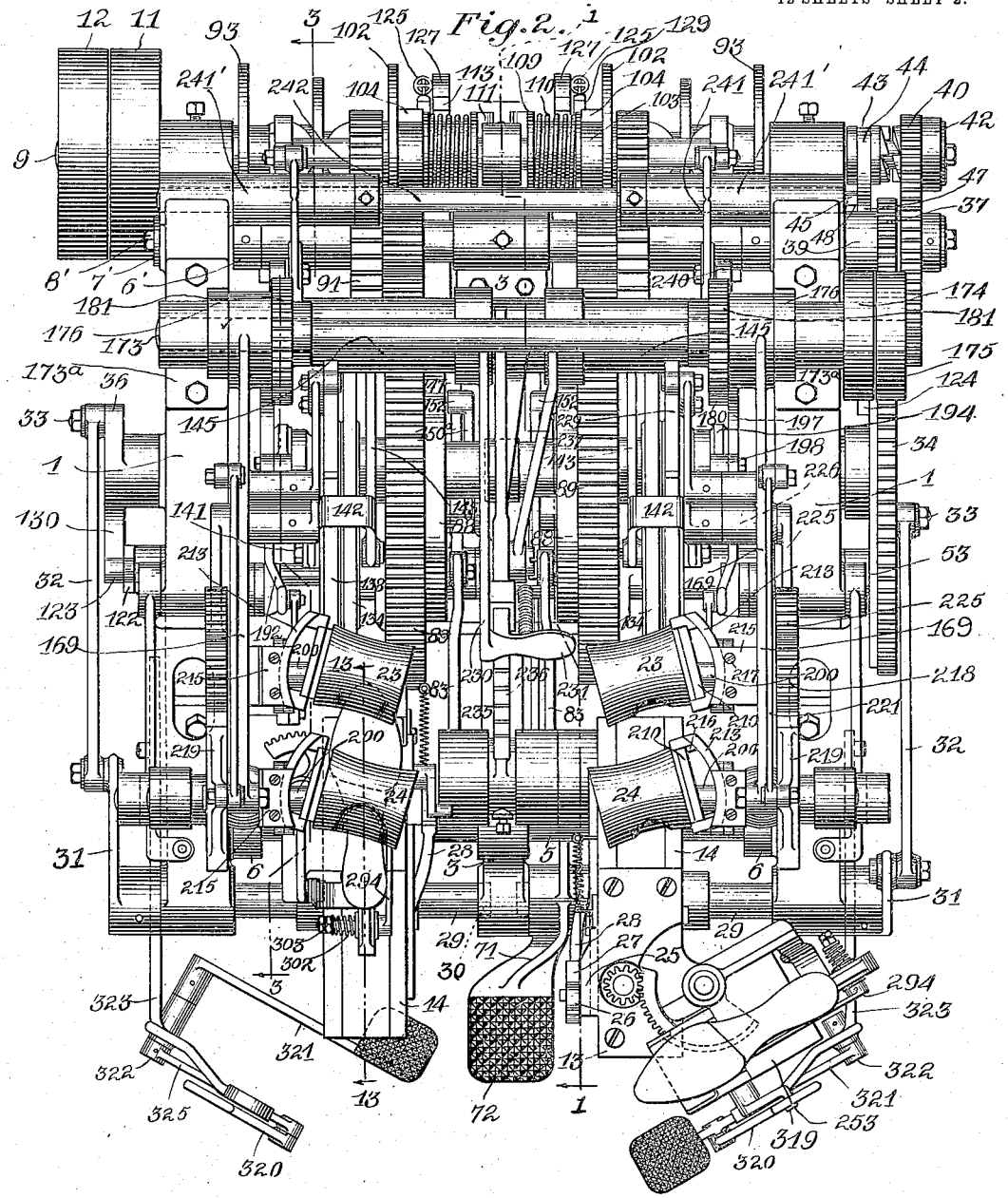
Figure 3:
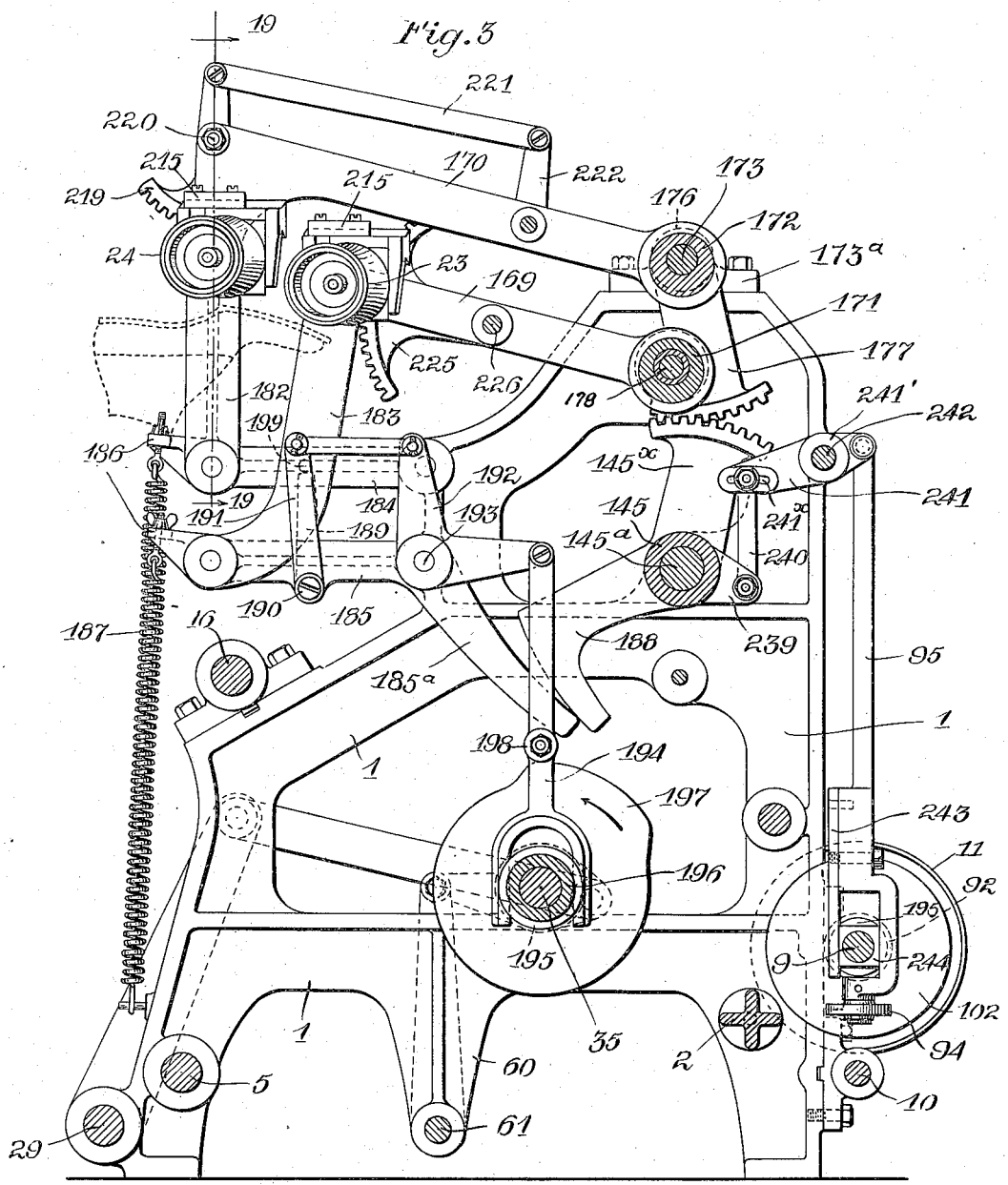
Figure 4:
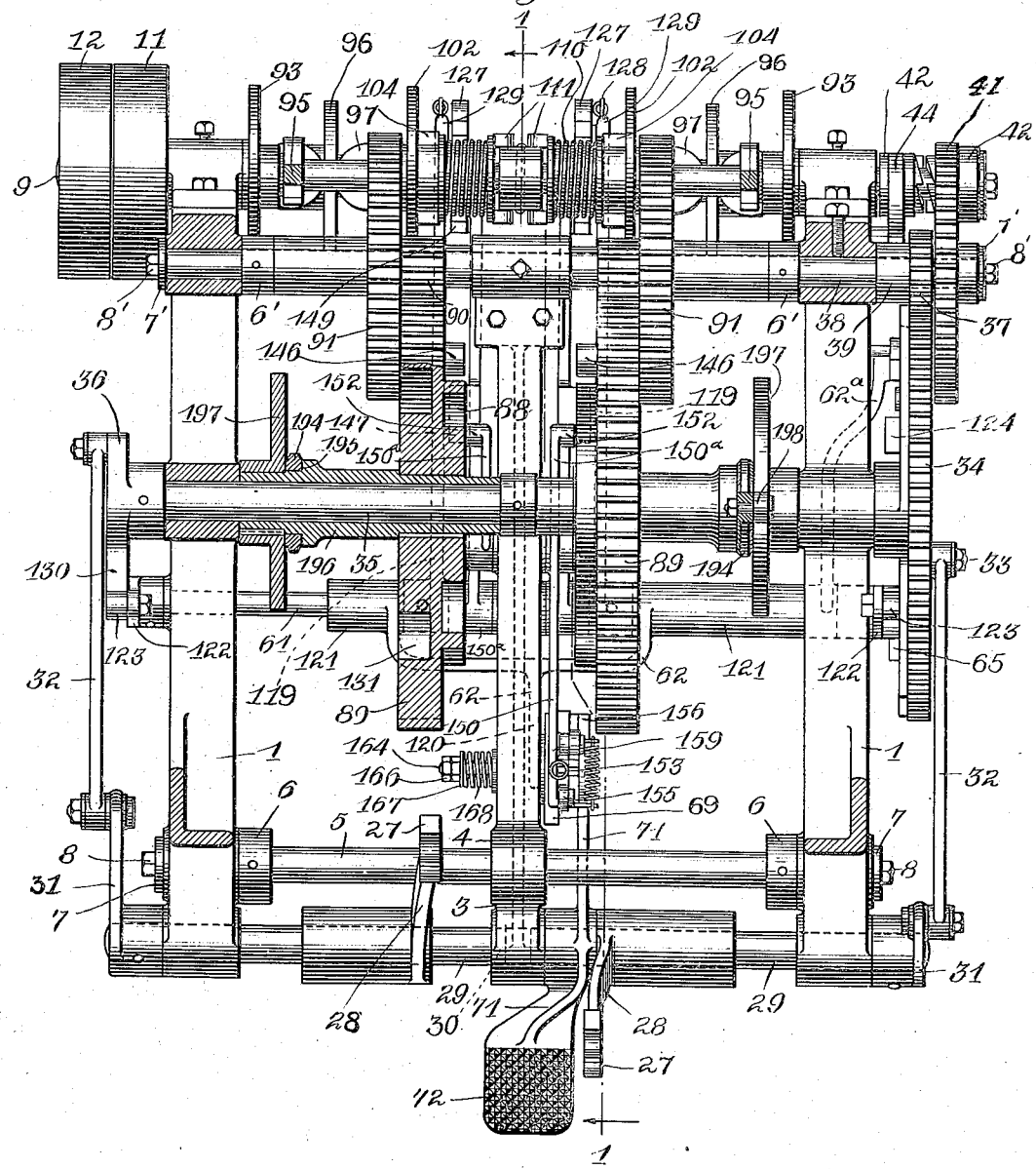
Figure 5:
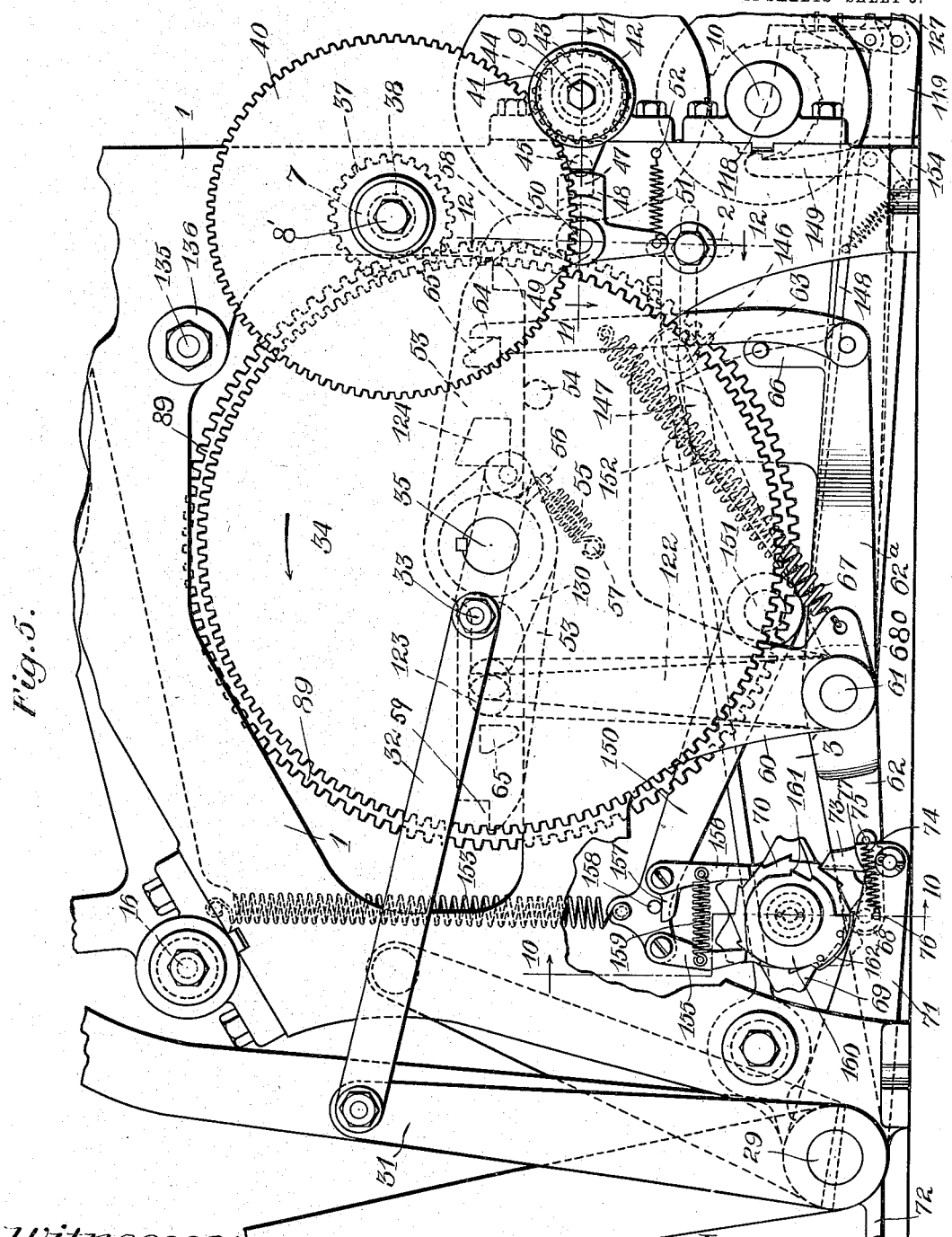
Figure 6:
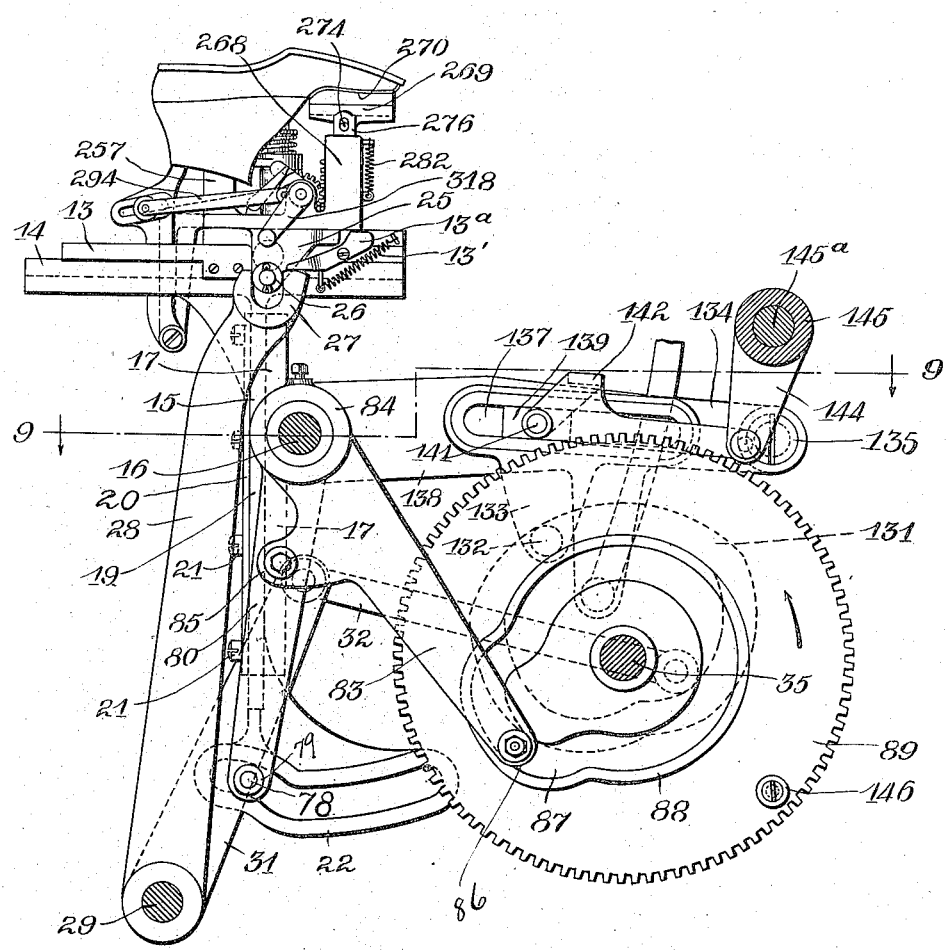
Figure 13:
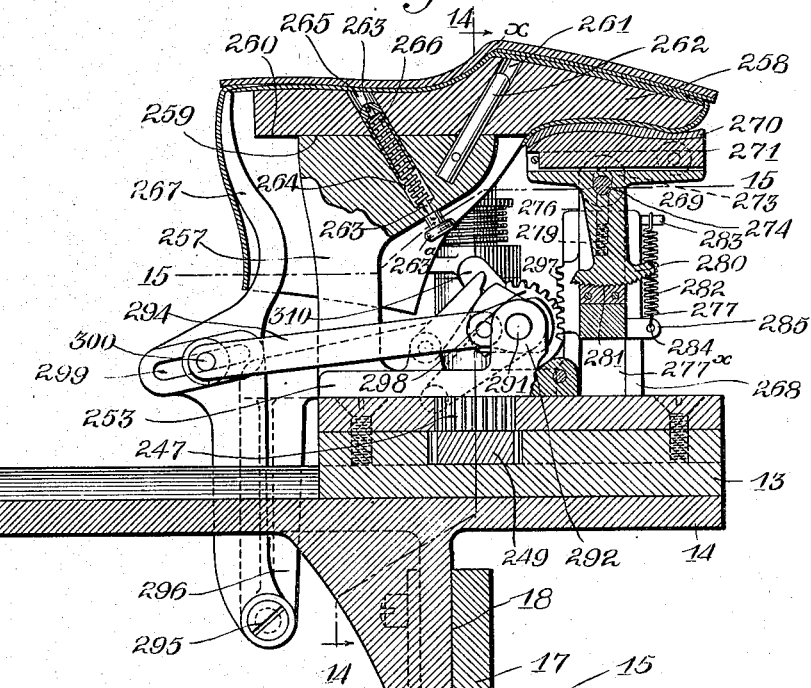
Figure 14:
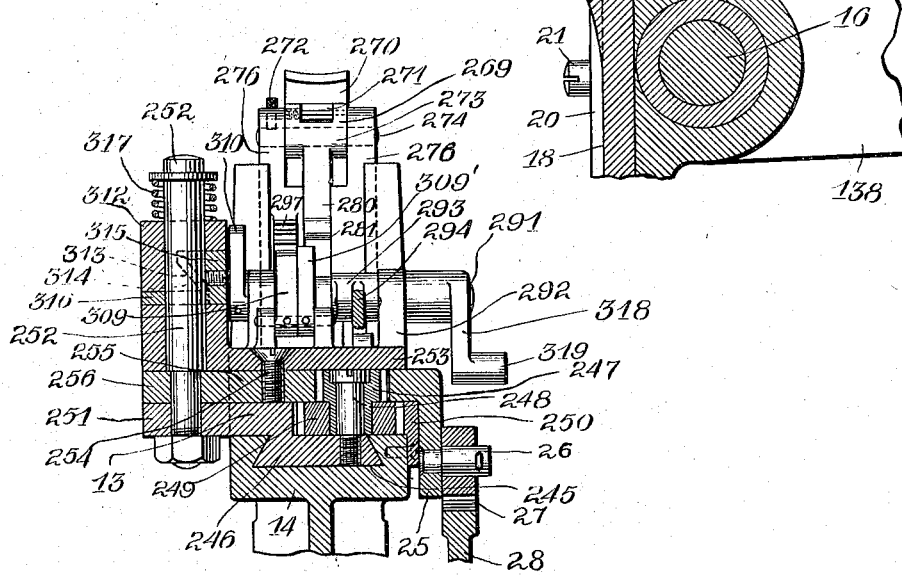

In the drawings;—Figure 1 is a central vertical and longitudinal section taken on the line 1—1 of Figs. 2 and 4 of a machine typifying a preferred embodiment of my invention and selected for purpose of illustration only; Fig. 2, a plan of said machine; Fig. 3, a vertical longitudinal section taken on the line 3—3 of Fig. 2; Fig. 4, a transverse horizontal section on the line 4—4 of Fig. 1; Fig. 5, an enlarged elevation of the right side of the lower part of the machine; Fig. 6, a detail in longitudinal vertical section on the line 1—1 of Fig. 2; Fig. 7, an enlarged detail in rear elevation and partly in vertical section of the base of the machine, to show the drive and operating shaft and the clutch mechanisms therefor; Fig. 8, a vertical sectional detail on the line 8—8, Fig. 7; Fig. 9, an enlarged longitudinal and horizontal section taken on the line 9—9 of Fig. 6, to show the mechanism and connections for rocking the jack; Fig. 10, a vertical sectional detail taken on the line 10—10 of Fig. 5, to be referred to; Fig. 11, a horizontal sectional detail on the line 11—11 of Fig. 5, to show the position of the clutch for controlling the jack positioning mechanism; Fig. 12, a vertical sectional detail and partial elevation of the same on the line. 12—12, Figs. 5 and 11; Fig. 13, an enlarged vertical sectional detail taken through the left jack table and slide on the line 13—13 of Fig. 2; Fig. 14, a vertical and transverse sectional detail thereof, from the left, on the line 14—14 of Fig. 13, the last support and the shoe being removed; Fig. 15, an enlarged detail in plan and partial horizontal section on the line 15—15 of Fig. 13; Figs. 16 and 17 are longitudinal vertical sectional details taken on line 16—16 of Fig. 15, respectively to show the toe rest and jacking mechanism in jacked and unjacked positions; Fig. 18, an enlarged horizontal sectional detail taken on the line 18—18 of Fig. 1, to show the fore part form and its carrier; Fig. 19, an enlarged vertical sectional detail on the line 19—19 of Fig. 1, to show the shank form and its carrier and the mechanism in which the form is mounted; Fig. 20, a sectional detail, partly in elevation, on the line 20—20 of Fig. 18, to show the adjusting mechanism for positioning the form; Fig. 21, a detail in side elevation of the right jacking treadle and its connections for controlling the right jack; Fig. 22, a detail in front elevation of the mechanism for operating the jack cam slide, and Fig. 23, a detail, to show a modified form of segment and the separate adjusting levers, to be referred to. Fig. 24 is a detached view of one of the formers showing the circumferential pattern extending about the same.

In the particular embodiment of my invention, herein selected for purposes of illustration and shown in the drawings, referring first to Figs. 2 and 4, the machine is provided with a suitable frame work to support the operative parts, the same, as herein shown, comprising the vertical side frames 1 (Figs. 2, 3 and 4) connected at their rear lower portions by a cross girder 2 (Figs. 1, 3 and dotted lines Fig. 5), upon which is bolted the rear end of an intermediate frame or bottom girder 3 (Figs. 1 and 4), which extends forward and is provided at its front end with a boss 4, to receive a horizontal tie rod 5, secured at its outer ends to the front lower portions of said side frames 1, in the present instance, by collars 6 and 7 and securing bolts 8. At the rear of said cross girder 2, said side frames are provided with suitable bearings (Fig. 7) for the main drive shaft 9, and immediately beneath it, for a lower fixed shaft 10, said drive shaft having at its outer left end, the usual fast and loose pulleys, 11, 12, respectively, through which it is rotated when desired from any suitable or convenient source of power, said shaft, when the machine is in use, being constantly rotated.

One or more shoe supports or jacks may be employed. In the present instance, however, two jacks are employed, each having two sole formers associated therewith, and constituting a twin or duplex machine, though obviously any other number of formers could be used with each jack. The formers, herein shown as forms or molds and respectively indicated by reference numerals, 23 and 24, in the present instance, combine the advantages of the usual leveling rollers and the oscillatory mold or form, and, as will be fully explained later, are adapted to be vibrated upon the shoe sole mounted on the jack and simultaneously oscillated to shape the shoe sole accordingly. The machine is arranged to maintain one of these jacks in an outer position to facilitate the application of a shoe thereto, while the other is in position beneath the sole leveling forms referred to, and suitable means are provided for moving the jack to which a shoe has been applied into position beneath the forms, for raising it to bring the shoe sole into molding contact with said forms and for vibrating and oscillating the latter while said jack is rocked to and fro to progressively mold or level the shoe sole, and finally at the conclusion of said molding operation, to depress the jack and stop the machine, or, if desired, to move the jack outwardly and turn it into convenient position for removal of the shoe and the application of another shoe thereto. The mechanism for producing these movements will be best understood by describing them in the order above named, first, however, describing the jack supporting means.

Since the construction of the jacks and their operating and adjusting mechanisms are substantially alike, the description of but one is here given and will be sufficient, such differences of construction as exist being pointed out in the proper place, it being understood that like reference characters represent like parts, operating in like manner in the similar jack mechanisms.

Referring now to Figs. 1 and 13, the jack A is here shown as mounted upon a slide 13 adapted to move in and out on a jack table 14, which is in turn mounted to slide vertically in a rocking guide 15, said guide being pivotally mounted upon a horizontal pivot shaft 16 extending clear across the front of the machine and supported and secured at its outer ends (Figs. 3, 5, 9 and 21) upon said side frames 1. Said rocking guide 15 (best shown in Figs. 6, 21 and 22) is formed as a T shaped lever having a hubbed head by which it is mounted on said shaft 16, its opposite arms 17 extending vertically and provided at their front faces with longitudinal vertical and alined recesses constituting guideways 18 (Figs. 9, 13 and 22) to receive a depending vertical arm 19 of said jack table 14, said arm 19 being retained therein by lateral face plates 20 suitably secured thereto as by bolts 21. At its lower end this depending arm 19, in the present instance, is provided with a slotted cam slide 22 (Figs. 1, 6, 9 and 22) which is operated to elevate and depress said arm, its table and the jack carried thereby as will be more specifically described later on.

To oscillate the jack from an outer position, in which a shoe may be conveniently applied or removed, to an inner operative position beneath the forepart form 23 and said shank form 24 (Fig. 1) which operate upon and mold or level the sole of a shoe mounted on the jack, I preferably provide the following mechanism: At its inner side said jack slide 13 is provided with a depending arm 25 (Figs. 1 and 6) overhanging the inner edge of said table 14, its lower end carrying a horizontal roller or other stud 26, normally received into the forked or recessed head 27 of a vertical rock shaft arm 28. This arm is secured at its lower hubbed end to a horizontal rock shaft 29 journaled at its outer end in a bearing formed at the lower front corner of said side frame 1 and at its inner end in a lateral socket bearing 30 formed in the front end of said intermediate bottom frame or girder 3, there being two such shafts, one for each jack. To oscillate the right rock shaft 29 (Figs. 2, 4, 5 and 21), its outer end is provided with a vertical rock arm 31 connected by a link 32 with a crank pin 33 on a vertical gear wheel 34 secured to a central operating shaft 35 extending horizontally across the machine and through suitable bearings in said side frames 1. The left rock shaft 29 is similarly provided with inner and outer vertical arms 28 and 31 respectively and with a similar link 32, which, in the presnt instance, is similarly connected at its inner end to a crank arm 36 on the left end (see Fig. 4) of said operating shaft 35, so that the rotation of said shaft will simultaneously oscillate both rock shafts 29 to reciprocate the jack slides 13 in and out. It being desirable, furthermore, to move these jacks alternately to place or maintain one in an outer shoe receiving position while the other is presented inwardly to the forms and progressively moved to level the shoe, the crank arm 36 (Fig. 4) is set 180° in advance or in rear of the position of said crank pin 33 and the left rock shaft arms 28 and 31 operated thereby are secured or set at the required angles to attain such movements. Said gear wheel 34 is driven by a pinion 37 (Fig. 4 and dotted lines Fig. 5) fast on the hub 39 of a gear wheel 40 loosely mounted on the right exterior end of a horizontal pivot shaft 38 secured at its left end (see Fig. 4) in the left side frame 1 by means of inner and outer retaining collars 6' and 7' respectively and an end bolt 8' similar to those used in securing the tie rod 5 to the side frames 1. At its right exterior end, however, said shaft receives the hub of said gear wheel 40 (Figs. 4, 5, and 11) which is retained thereon by the collar 7' and bolt 8'. This gear wheel meshes with a driving pinion 41 loosely mounted on the right exterior end (see Fig. 7) of said drive shaft 9 and is adapted to be connected therewith when desired to be rotated thereby thus to rotate the intermediate gears and said operating shaft 35. To this end suitable clutch mechanism is provided, herein shown as a slidable clutch collar 42 (Figs. 4, 7, and 11) splined to said shaft to rotate constantly therewith and provided on its outer face with teeth adapted to engage similar teeth formed on the inner face of said pinion 41.

To slide this collar, it is provided with a circumferential or peripheral groove 43 to receive the horizontal arms of a yoke 44 (see Fig. 11) extending transversely and rearwardly from the outer end of a horizontal rod 45 slidably mounted in a socket or bearing 46 formed in the right side frame 1. At its head this rod is provided with a roller or other stud 47 (Figs. 5, 11 and 12) adapted to run in an oblique groove 48 (Fig. 12) formed at the rear end of a horizontal arm of a double bell crank 49, pivoted at its hubbed angle on a horizontal stud 50 also secured in said side frame 1. The elevation of the grooved end of this bell crank operates, by its action on said roller, to swing the latter, its supporting rod 45, and said yoke outwardly, to cause the clutch collar 42 to move with it and clutch said pinion 41 to rotate the latter with it. Similarly, depression of said grooved end moves the clutch inwardly to release said pinion from operative rotary connection with said drive shaft. The lower vertical arm of this bell crank is connected by a spring 51 (Fig. 5) with a pin 52, adjacent the rear edge of said side frame 1, said spring acting normally to elevate said horizontal arm to slide said clutch collar outwardly as just described, or to the left Fig. 7, into operative engagement with said pinion 41. The horizontal arm of this bell crank 49, however, is normally maintained in a horizontal position with the roller 47 and yoke 44 holding the clutch collar out of operative engagement with said pinion, so that the mechanism for moving the jack into and out of position normally remains at rest. To maintain said clutch and its roller actuator in such position and to permit the spring to act when desired to start this jack positioning mechanism, said operating shaft 35 (see Fig. 5) is provided with a trip or actuating lever 53, loosely mounted by its hub thereon and normally maintained in horizontal position, with its lower rear edge resting upon a stop and carrying pin 54, by a spring 55 connecting a pin 56 of said hub with a pin 57 on said gear wheel 34. At its end this lever 53 is provided with cam-faces to engage the cam end of an upwardly extending vertical arm 58 (see Fig. 5) of said pivoted bell crank or clutch actuator 49 and by which the latter is prevented from swinging inwardly so that it and said clutch collar 42 are maintained in the inoperative position just referred to. The cam ends of said lever 53 are provided with rectangular notches 59 to permit the cam end of said lever arm 58 to swing inwardly when the notched end of said trip lever 53 is elevated, said bell crank 49 being actuated by its spring 51 to operate the clutch as soon as the rear end of said lever 53 is sufficiently elevated.

To provide suitable means for holding the trip lever 53 horizontal with the bell crank and clutch in normal inoperative position and the machine at rest, the base of the right side frame 1 and the intermediate girder frame 3 are respectively provided with depending ears 60 and 680 (Fig. 5) in which a rock shaft 61 (Fig. 3) is journaled. Mounted on this shaft is a horizontal yoked or Y-shaped starting lever 62 (Fig. 4) its hubbed arms forming loose sleeves on said shaft so that it rocks freely thereon. The right hub of this lever is provided with a rearwardly extending arm 62$^a$, the rear end of which is provided with an upwardly extending arm 63 (Fig. 5) having a notched or shouldered upper end 64 to engage a projecting lug 65 on the arm of said trip lever 53. This arm 63 is normally maintained in vertical position against a stop 66, formed at the rear end of said arm 62$^a$, by means of a coiled spring 67 connecting it with an ear of said side frame lug 60. Elevation of said arm 62$^a$ elevates said vertical arm 63 and said horizontal trip lever 53 sufficiently to permit the cam end of the bell crank actuator 47 to swing inward or forward (Fig. 5) through the action of its spring 51, to operate the clutch to rotate the gears and said trip lever 53 which is carried around by the action of said carrying pin 54 (Fig. 5). To depress the front arm of said lever 62, thereby to elevate its rear arm to operate the clutch as described, any suitable means may be employed, though I prefer that herein shown in which the front end of said lever 62 (Fig. 5) is provided with a horizontal roller or other stud 68 (Fig. 10) adapted to rest upon or between the teeth of a cam or star wheel 69 (see Figs. 1, 4, 5 and 10) mounted on a tubular shaft or bushing 163 (Fig. 10) secured on said bottom girder 3 and driven by means of a ratchet wheel 70 mounted on its hub and secured to its outer face (Fig. 10), and actuated by the operation of a suitable pawl and connected mechanism. This mechanism preferably comprises a treadle lever 71 loosely mounted on said rock shaft 29 (see Figs. 2, 4 and 5) the tread 72 of which extends forwardly at the base of the machine into a convenient center position for operation. The rear end of this treadle carries a vertical pawl 73 pivoted thereto which engages the teeth of said ratchet wheel 70 and is normally retained in engagement therewith by a coiled spring 74 connecting a horizontal pin 75 thereon with a pin on said treadle. Said pin 75 is adapted to engage a stop or lug 77 at the rear end of said treadle, which operates to limit the forward movement of said pawl so that it may not be sprung down out of operative relation to its ratchet wheel 70.

With the machine at rest, the roller 68 normally rests between the teeth of said star wheel but as the pawl end of said treadle is elevated by depressing said tread 72, the ratchet is turned through the space occupied by one tooth correspondingly rotating the star wheel, causing the latter to act on and depress said roller 68 to cause it to rest in a recess or groove at the outer end of the next tooth, this movement respectively elevating the arms 62ª, 63 and the notched end of the trip lever 53, thereby operatively moving the clutch to rotate said gear wheel 34 in the direction of the arrow (Fig. 5). As has been stated this movement of the gear wheel moves the outer jack into leveling position relative to the forms and the jack already in such position, outwardly into shoe removing or receiving position. By the rotation of said gear wheel 34 the trip lever 53 is carried around with it, through the action of said pin 54, until a half rotation thereof has been effected and causing the cam face of its rearwardly revolving and rising arm to engage the cam face of said bell crank actuating lever 49 and swing it rearwardly to operate the clutch to stop the jack positioning mechanism immediately as said jacks are respectively moved into inner and outer positions. The right jack, for example, having been moved into a position beneath the forms, the jack table is next elevated or raised sufficiently to release the slide roller 26 from engagement with the forked head 27 of said rock shaft arm 28, so as to permit the jack to be rocked or oscillated to and fro beneath said forms 23 and 24 and also to raise the jack to present the shoe sole to the action thereof. To this end, the cam slide 22 (Figs. 1 and 9) is provided with a cam slot to receive a horizontal roller 79 (Figs. 9 and 22) mounted on a horizontal pivot shaft 78 connected at its ends to the lower ends of depending arms or carriers 80 (Fig. 22) hubbed at their upper ends upon said jack supporting shaft 16, the hub 81 of the upper arm forming a sleeve upon said shaft 16 and furnishing a bearing for the hub or head of said rocking guide 15 and also for the hubbed end 82 of the inner carrier or arm 80. In the operation of the machine this inner arm is oscillated by the movements of an actuating lever 83 (Figs. 1, 6, 9 and 22) having a hub 84 at its upper end loosely mounted on said sleeve or hub 81, immediately below which is a forwardly extending ear 85 bolted or otherwise secured to said inner arm 80. The lower end of this lever 83 is provided with a cam roller or other stud 86 (Figs. 1, 6, 9 and 22) running in a cam groove 87 of a cam 88, secured or formed upon the inner face of a gear wheel 89 loosely mounted on said central shaft 35. The rotation of this gear wheel 89 imparts a forward and back movement to said slide roller 79, which running in the cam slot of said slide 22 and by its action thereon first elevates it to raise the jack slide and its jack to bring the shoe into operative position relative to said forms 23 and 24 and, at the conclusion of the progressive movements of the jack, presently described, then depresses it to depress said jack out of contact with said forms. To rotate said gear wheel 89 it is meshed (see Figs. 1 and 4) with a driving pinion 90 (Figs. 1 and 4) formed upon or secured to the hub of a gear wheel 91 (Fig. 4) loosely mounted on the pivot shaft 38 and in its turn driven or rotated by a gear 92 (see Fig. 7), loosely mounted on and adapted to be operatively connected with said drive shaft 9. As it is only desirable, however, to rotate said gear wheel 92 when the corresponding jack has been moved into inner position beneath its associated forms, the drive shaft 9 (Fig. 7), normally rotated constantly as described, is herein provided immediately interiorly of said side frames 1 with friction disks 93, fast thereon, each of which is in frictional engagement with an adjustably mounted horizontal disk 94 journaled at the bottom of a vertically slidable yoke frame 95 embracing said shaft 9 and which may be moved toward or from the periphery of said disk 93 so that variable speed of rotation may be produced. At their inner edges said frictional disks 94 engage and drive frictional disks 96, loosely mounted on the lower pivot shaft 10 referred to, and which in turn drives a horizontal disk 97 journaled on a vertical stud 98 upon a slidable collar 99 of said pivot shaft 10. This shaft has a horizontal pin 100 engaging a recess or slot 101 in said collar to prevent the latter from turning on said shaft and to permit it to slide thereon while guiding its movements in and out, so that the frictional contact between the disks 96 and 97 will only operate to rotate the latter as it is forced into contact with the disk 96. Said gear 92, referred to as slidably mounted on said drive shaft 9, is rigidly secured (see the right Fig. 7) to the hub of a disk 102 so that both slide and rotate together.

To provide suitable means for sliding said gear 92 and the disk 102 to cause them to be rotated by the action of said friction disks, any suitable means may be employed, though I prefer to use that herein shown and now to be described wherein the hub of the disk 102 is provided with a peripheral groove 103, to receive the yoke arms of a lever 104 pivotally mounted, as by a pivot pin 105 (Figs. 7 and 8) on a horizontal overhanging arm 106 of a collar 107 secured on said pivot shaft 10. The outward movement of the yoke arms of the lever 104 permits the disk 102 and said gear 92 together constituting the movable clutch of the jack elevating and rocking mechanism, to slide outwardly to bring the former into engagement with and to move the friction disk 97 also outwardly into frictional contact with the constantly rotating disk 96 thereby causing rotation of said disk 102 and said gear 92, the latter remaining constantly in mesh with the gear 91, and rotating the same with it. For moving said disk 102 and its connected gear wheel 92 outwardly when permitted by the movement of said lever 104 said shaft 9 is provided with a slidable collar 108 (Fig. 7) provided at its inner end with a circumferential flange 109, against which is seated the end of a coiled spring 110 surrounding said collar and bearing upon the inner face of the hub of said disk 102 and acting to separate said collar and disk. To prevent said collar 108 from sliding inward, its inner face normally rests against the arms of a yoke lever 111 (Figs. 2, 4 and 7), embracing said shaft and pivoted at the angle of said overhanging arm 106. A horizontal arm 112 of said lever 111 is acted upon and depressed by a similar arm 113 of said yoke lever 104, so that as the yoke arms of said lever 104 are swung to the right (Fig. 7), said collar 108 and the hub of said disk 102 are moved toward one another against the tension of and compressing said spring 110 and moving the disk 102 away from the disk 97 and preventing further rotation of said disk 102 and gear wheel 92. The yoke lever is normally maintained in this position by suitable starting and stopping mechanism automatically actuated by the jack positioning mechanism referred to and permitting outward movement of said yoke lever as the jack reaches its inner position. The yoke end of said lever is then positively swung outward by the expansion of said spring 110 thereby sliding the collar 108 inwardly and the friction disk 102 and its gear 92 outwardly to produce rotation of the jack elevating mechanism referred to. The inward movement of the collar 108, however, is limited by a central shaft collar 9ª fast on said drive shaft 9 and constituting an abutment for said collar, so that as the yoke levers are released, said spring 110 operates most effectively upon the disk 102 thereby to produce rapidity of clutch action.

The position and movements of the yoke arms of the levers 104 and 111 are determined and controlled through the movements of a vertical depending arm 114 (Figs. 7 and 8) of said yoke lever 104, which at its lower end is provided with a cam roller 115 running upon the side of a cam disk 116 loosely mounted on a sleeve 107ª on said collar 107 provided as herein with a series of teeth or lateral projections upon or between which the said roller is adapted to rest. Secured to the inner side of this cam disk 116 (Fig. 7) is a ratchet wheel 117 also journaled on said sleeve 107ª and operated by a vertical pawl 118 (Figs. 7 and dotted lines Fig. 5) pivotally mounted at the rear end of a rearwardly extending arm 119 (Figs. 4 and 5) secured to said rock shaft 61. As will be readily understood from the foregoing description, said rock shaft 61 does not extend clear across the machine but two short shafts are provided, which are mounted as described in said frames and bottom girder, the yoke shaped starting lever 62 (see particularly Fig. 4) having its yoke end 120 provided with suitable hubs 121, the one on the right being loosely mounted on the right shaft 61 while the other or left (Fig. 4) is loosely mounted on the left shaft 61.

To elevate the pawl end of said arm 119 and to operate the clutch mechanism just described and furthermore that the latter may be actuated by the trip lever 53 immediately following the movement of the jack into leveling position beneath the forms, the outer end of the right rock shaft 61 (Figs. 2, 4, and 5) is provided with a vertical arm 122, herein shown as pinned thereto and having a roller 123 at its upper end, and which is engaged and operated by a cam projection 124 on the rear arm (Fig. 5) of said trip lever 53. As the latter is rotated through a half revolution said projection 124 will strike said roller and swing its supporting arm 122 to the left (Fig. 5) to rock said shaft 61 and thereby elevating said rear arm 119 and its vertical pawl 118 and turning said ratchet 117 and the connected cam 116 through the space occupied by one tooth, permitting the roller to enter the depression between the teeth or lateral projections of said cam. This movement permits the yoke end of said lever 104 to swing outwardly as described and separation of the collar 108 and disk 102 which is produced by the action of said spring 110. Said clutch disk 102 is thus slid outward to bring it into frictional engagement with what may be termed the speed wheel or disk 97, referred to, and sliding the latter into operative connection with the drive shaft 9 through the connecting speed disks 96, 94 and 93 respectively. As herein shown this pawl 118 (see Fig. 7) is provided with spring pressed means for holding it in engagement with the ratchet wheel 117, said means comprising in the present instance, a coiled spring 125 (see Fig. 7) connecting a horizontal pin 126, on a rearwardly extending arm 127 of said pawl, with a horizontal pin 128 on a vertical lug 129 of said arm 119.

To operate and control the movements of the left rock shaft 61, and its gear wheel 89, it is, as herein shown, provided with duplicate mechanism (see Fig. 4), except that the cam roller 123 at the upper end of its vertical rock shaft arm 122, which is positioned at the left outer end of this rock shaft, is actuated by the cam end of a rearwardly extending arm 130 (see dotted lines Fig. 5) of said crank 36, and which, as stated, is on the opposite side of said shafts 61 relative to the cam projection 124 of said trip lever 53, so that said arms 122 and 119 respectively are alternatively oscillated to alternately and successively actuate the pawls 118, ratchets 117 and the clutch mechanisms connected therewith. That the jack may be rocked or oscillated immediately following its elevation or presentation to the leveling forms referred to, the outer face of said gear wheel 89 is also provided with a cam groove 131 (Fig. 4 and dotted lines Fig. 6) in which runs a roller 132 carried at the lower end of a depending arm 133 of a horizontal lever 134 (best shown in Figs. 6 and 9) pivoted by its hub on a horizontal stud 135 secured in an inwardly projecting boss 136 (Fig. 9) of said side frame 1. In the operation of the machine, the rotation of said gear wheel 89 rocks said lever 134 vertically and that its motion may be transmitted to the jack table supporting guide 15 and the jack carried thereby, to move the latter progressively relative to said forms, said lever is provided with a longitudinal slot 137 (Fig. 6) and said guide 15 with a similarly slotted arm 138 in juxtaposition therewith, slide blocks 139, 140 being respectively mounted in the slots of said lever and guide as indicated in dotted lines in Fig. 9. These blocks are mounted on a pivot pin 141 extending through said slots and supported at its ends by the depending arms of a yoke 142, formed at the inner or front end of a link 143 (see Figs. 6 and 9) which is pivotally mounted on a depending arm 144 of a sleeve 145 (Figs. 1 and 6), in turn loosely mounted on a pivot shaft 145$^a$ journaled at its ends in said side frames 1. This sleeve is adapted to be turned or adjusted to swing said arm 144 back and forth, thereby to slide or adjust the blocks 139 and 140 inwardly or outwardly in the slots of said lever 134 and guide arm 138 respectively, so as to vary the rocking movement of said guide and thereby the jack, in operating upon different sizes of soles as will be more fully described later. It is sufficient here to state that the rocking of said lever 134 through the action of said cam groove 131 on the roller 132 and the slide blocks 139 and 140, swings the guide arm 138 vertically thereby rocking the jack table, its jack and the shoe mounted thereon back and forth to produce the desired progressive leveling movement in contact with leveling forms 23, 24 referred to.

It may be here noted that the described mechanisms for elevating and producing the leveling movements of the jack are set in operation by that for moving the jack into leveling position and by referring to Fig. 6 it will be apparent that the cam grooves 87, 131, respectively are so placed that the jack is elevated to present the shoe sole to the action of said forms 23, 24 before the progressive leveling movements of the jack take place, so that the shoe may be first placed in predetermined position relative thereto as will be more clearly described later. In the present instance, a single oscillation of the jack is produced, rocking it first rearwardly, preferably toe first, and then back into what may be termed its initial leveling position where it rests, though obviously by varying the cam groove or said gears any other desired or predetermined number of oscillations could be effected, my invention not being limited in this respect.

That the longitudinal progressive or rocking movements of the jack may be stopped, leaving it in its initial inner position just referred to while the other jack is at rest in shoe removing position, the gear wheel 89 is provided on its inner face with a roller 146 (Figs. 1, 4, 5, 6 and 9) which runs under and lifts an overhanging cam lug 147 on a rearwardly extending arm 148, loosely mounted by its hub on said rock shaft 61.

The rear end of this arm is provided with a spring pressed pivoted pawl 149, standing in front of and engaging the teeth of said ratchet 117 and acting, upon the elevation of said arm 148, to slip over and engage a tooth above it and by its subsequent depression to rotate said ratchet 117 and its cam 116. This movement brings a projection of said cam 116 to and to move the roller 115 outwardly, swinging the yoked ends of the levers 104, 111, toward one another thereby to release the gear wheel 92 from operative connection with the constantly rotating drive shaft and thus stopping the jack progressive or rocking mechanism of the machine. To positively produce the depression of the pawl 149, as said roller 146 passes out from under the cam lug 147 and the jack is returned to its initial leveling position beneath said forms, I have in the present instance (see Figs. 1 and 5) provided a bell crank 150 fast on a rock shaft 151 journaled in said bottom girder or frame 3 and having a lateral projection 152 on its rearwardly extending arm which overlies and is maintained upon the upper inclined face of said cam lug 147 by a coiled spring 153 (Fig. 5) connecting the front arm of said bell crank with a stationary part of the machine. This spring normally acts to lift the arm connected therewith and to depress the opposite arm and through the projection 152 said cam lug 147 and its supporting arm 148, thereby again turning said ratchet 117 in the same direction as that produced by the pawl 118 on its rear side. This partial rotation or stepping movement of the ratchet wheel turns the cam 116 to cause one of its projections to force the roller 115 carried by the yoke lever arm 114 outwardly to operate the yoke levers 104 and 111, as described, to release or disengage the disk 102 from rotary connection with the drive shaft so that the movements of the leveling and elevating mechanisms are and can only be stopped with the jack in its said initial position. For stopping the left jack leveling movements, said rock shaft 151 is similarly provided with a rear rock arm 150ª (Fig. 2), fast thereto on the left side of said frame 3 and having a similar projection 152 to be similarly operated by the cam lug 147 of its associated cam.

To prevent the pawl 149 from being depressed a distance greater than is necessary to rotate the ratchet through the space occupied by one tooth, said arm 148 is provided with a depending stop lug or foot 154 (Figs. 1 and 7) adapted to strike the floor and limit its downward movement. That the star wheel or cam 69, however, may be turned so as to leave the yoke lever roller 68 (Fig. 5) in a depression between two of its adjacent teeth instead of in the groove in the top of one of them, so that the operative may again by the depression of the treadle start the jack positioning mechanism to level a second shoe mounted on the other jack when it was moved to shoe removing position, or to withdraw the leveled shoe for removal, the front arm of said bell crank 150 is provided with a spring pressed depending pawl 155 (Fig. 5), which engages the teeth of said ratchet wheel 70 on the front side and operating to turn said ratchet and the star wheel connected therewith as the bell crank is rocked when its projection 152 is lifted by the operation of said gear wheel roller 146. By this movement the yoke lever roller 76 rises between the teeth of said star wheel, so that it may again be depressed by the rotation of the latter upon the next depression of the treadle when it is desired to again operate the jack positioning mechanism. As has been stated, this arrangement causes the machine to stop with one jack in outer or shoe applying position while one having the leveled shoe thereon is left depressed, but still beneath the leveling forms and that said jack positioning mechanism may be operated automatically to cause the jack, with the leveled shoe thereon, to be moved out into shoe removing position and the other jack, to which a shoe has been applied, to be thrown in, elevated, the shoe sole leveled and the machine stopped with the jack down, I have, in the present instance, provided the following mechanism: In the rear of its pawl 155 (Figs. 1 and 5), said bell crank 150 is provided with another pivoted pawl 156 having a horizontal stop arm 157 (Fig. 5) to engage a pin 158 on said bell crank to prevent its moving forwardly beyond a vertical position, said pawls being connected together by a coiled spring 159 to hold them in operative positions. This pawl 156 engages and operates a second ratchet wheel 160 (Figs. 5 and 10), loosely mounted upon the hub of said cam 69 and pressed against the outer face of said ratchet wheel 70 so that both are simultaneously rotated. Said ratchet wheel 160 is also provided with but two teeth 161 (Fig. 5) and carries a shield 162 adapted to be turned as said ratchet wheel 160 is actuated to slide over and cover the teeth of the ratchet wheel 70 so that the treadle pawl 73 is prevented from engaging the teeth of said ratchet wheel 70 when the shield has been turned through the space occupied by two teeth. By this arrangement obviously the treadle may be depressed twice in succession, first to start the machine and second to bring the yoke lever roller 68 into the next depression or space between the teeth of the star wheel, so that when the pawl 155 operates to turn the ratchet, the roller will be placed in the groove on the tooth thus turned to roller moving position to again start the jack positioning mechanism after it has been stopped by the action of the trip lever 53, described. Thus the jack positioning mechanism is again started after a single rotation of said gear wheel 34 and its trip lever 53, bringing the jack having the leveled shoe into shoe removing position instead of leaving it in its initial depressed position beneath the forms, and moving the shoe on the second jack in leveling position where it is automatically leveled, the jack depressed at the conclusion of said operation and the machine stopped. By this arrangement means are provided by which two shoes of a pair may be leveled before the machine is stopped, the rotation of the shield, covering the teeth of the ratchet on its under and inner side, preventing subsequent depressions of the treadle and the elevation of the pawl 73 from actuating said ratchet 70, so that carelessness on the part of the operative in again depressing the treadle has no effect upon the operation of the machine until the pawl 156 has been twice depressed to turn the ratchet 160 in the opposite direction to move the shield with it to its normal position and uncovering the teeth of the ratchet 70.

It will be understood that when the treadle is depressed twice the jack positioning mechanism will be started and stopped twice and the gear wheel 34 will rotate twice, causing two depressions of the pawl carrying arm of said bell crank 150 and rotating each of the ratchets through the space of two teeth and in opposite directions, and returning the shield carrying ratchet 160 to its initial or original position. That these ratchets may be rotated in opposite directions, they are mounted upon the hub of the star wheel 69 (see Fig. 10), itself loosely mounted upon the bushing 163 referred to as secured in said bottom girder 3. This bushing receives a slidable pin 164 having a circular flange 165 at its right end bearing upon the inner face of said ratchet 160. Adjustably retained at the left end of said pin 164 by clamping nuts 166 is a washer or collar 167, loosely mounted thereon, between which and said frame 3 and surrounding said pin is a coiled spring 168, acting to force said washer against its nut 166 thereon, and thereby sliding said pin and its flange 165 inwardly, or to the left (Fig. 10), to produce suitable frictional engagement between the two ratchets, so that the ratchet 160 is normally moved by and with said ratchet 70, but permitting it to be positively rotated in the opposite direction by its pawl 156. To withdraw the inner depressed jack into shoe removing position, when desired, more particularly when it has a leveled shoe thereon, the treadle is again depressed which again actuates the jack positioning mechanism, it being understood that the jack simultaneously moved inward will be automatically operated until finally depressed as described even though no shoe is mounted thereon.

Having described the mechanisms for positioning, elevating or depressing, and rocking the jacks, with their respective operative controlled adjustments and clutch mechanisms, I will next describe the forms and the means for operating and adjusting them.

In the particular embodiment of my invention herein selected for illustration only, referring particularly to Figs. 1 and 3, I have provided sole formers of novel type, herein shown, as forms or molds, two of which are employed in the present instances and adapted to operate upon two different portions of the shoe sole, one having a molded face to shape the forepart of a sole, the other to correspondingly shape the shank and heel seat end of the sole. I have designated these forms as forepart form 23, and a shank form 24, referred to, approximately roller shape, mounted to rotate on their carriers. Each is provided with an active mold face, arranged around the periphery of the form and corresponding both longitudinally and transversely to a desired shape of a forepart or shank of a shoe sole, and adapted to mold the same as the shoe is progressively moved in contact therewith by the movements of the jack, as described. These forms are vibrated back and forth over the portions of the sole they are adapted to shape and simultaneously turned or oscillated to cause the vibrating surface in contact with the work gradually to progress around or along the form to cause the latter always to conform to and produce the desired shape of and action upon the sole. By the provision of forms of this type all the advantages of the usual type of leveling rolls and forms *per se* used in beating out soles are combined with few of the disadvantages of either. Moreover, by respectively confining the movements of said forepart and shank forms to the forepart and shank of the sole a perfect balance is maintained between the forepart and shank of the sole both longitudinally and progressively and makes it possible to give either form a conformation positively to mold and clearly define the line of separation between the forepart and shank of the sole. Furthermore, the shank may be continuously molded to any desired pattern from said line of contact to the breast line or longitudinally between the ball and heel.

While the back and forth or rubbing movement of the forms is reciprocatory relative to their carriers or supporting frames, I desire it to be understood that I employ the term "vibratory" here and hereafter, in a general sense to include any to and from motion and not necessarily in a straight line. As here shown the forepart form 23 and the shank form 24 are respectively mounted on vertically swinging carriers 169 and 170 (see Fig. 3), which in turn are respectively pivotally mounted by their hubbed rear ends upon eccentrics 171, 172, the upper eccentric 172 being fast upon a driving shaft 173 journaled in suitable bearings 173ª at the heads of said side frames and the lower eccentric 171 (Figs. 2 and 3) fast to the hub of a gear wheel 180 journaled on a stud 178 carried by a rock arm 177 (Fig. 3) of a sleeve 176, loosely mounted on said drive shaft 173. At its right end (see Fig. 2) this drive shaft 173 is provided with the usual fast and loose pulleys 174, 175 respectively, by which said shaft may be constantly rotated or not, as desired, from any convenient source of power, said driving shaft being entirely independent, however, of the lower driving shaft 9 which operates and controls the movements of the jacks. The gear wheel 180 is in mesh with a similar gear 181 (Figs. 2 and 3) fast on said drive shaft 173, the eccentric 171 being pinned or otherwise secured to said gear wheel 180 to be rotated thereby. The rotation of this shaft rotates both gears and said eccentrics 172 and 171, reciprocating the carriers back and forth to vibrate said shank and forepart forms 24 and 23 respectively over the shank and forepart of the sole mounted upon the jack. The outer ends of these carriers are respectively provided with depending frames 182, 183, said frame 182 being pivotally connected by a horizontal link frame 184 and the frame 183 with the front end of a bell crank or pivoted frame 185, both pivotally mounted upon the adjacent side frame 1 This arrangement permits the rollers to swing vertically to bring them into engagement with the shoe and to rise and fall with variations in the contour of the tread face of the sole. To provide means for automatically producing suitable pressure to cause the forms to bear upon and if desired, to mold the sole to the desired shape, each of said frames 184, 185 is provided with a laterally extending ear or lug 186, to which a coiled spring 187 is connected, which at its lower end, in the present instance, is secured to a stationary part of the machine. By this arrangement the forms are depressed automatically to avoid the unnecessary waste of energy on the part of the operator to depress them by treadle means, as is common in machines of this type and securing greater uniformity of pressure and results than when treadle means are employed. That the forms may be prevented by the action of said spring 187 from following the shoe and jack when the latter is depressed from the position to which it is presented by the jack elevating mechanism, any suitable mechanism may be employed, though that herein shown is preferred, in which said bell crank 185 which supports the forepart form 23 has a rearwardly extending arm 185ª curved or cam shaped (best shown in Fig. 3) adapted to engage the L shaped cam arm 188 of said sleeve 145 which, as has been stated, is loosely mounted on said pivot shaft 145ª. This sleeve and its arm are adapted to be turned and set in a desired size position to vary the contact of the curved arm 185ª with the front face of said cam arm 188, thus to vary the position at which the depression of the frame 183, carrier 169 and the forepart form 23 supported thereby is arrested, as is desirable in operating upon shoes of different sizes or styles and consequently occupying a different height when moved into leveling position beneath said form.

To limit the depression of the shank form 24 relative to any arrested position of the bell crank 185, the horizontal arm of the latter is provided with a swinging vertical arm 189 (indicated by dotted lines in Fig. 3) and mounted upon a horizontal rock shaft 190, journaled in a suitable bearing in said bell crank frame 185. This rock shaft 190 extends inwardly through said bearing and at its inner end is provided with a vertical rock arm 191, linked at its upper end to the vertical arm of a bell crank 192 (Fig. 3), pivoted at 193 on the pivotal support of said bell crank 185, the horizontal arm of said bell crank 192 being provided with a vertical slide or actuator 194 forked at its lower end to embrace a peripheral groove 195 (Fig. 4), formed between a peripheral flange on the sleeve 196 and a cam 197 fast thereon. This sleeve 196 is loosely journaled on said operating shaft 35 and at its inner end receives the hub of said gear wheel 89, which is also secured thereto, so that the rotation of said gear wheel also rotates the cam 197. The slide or actuator 194 is provided with a roller 198 (Figs. 3 and 4) running upon the upper edge of said cam and elevated or depressed thereby to swing the vertical arm 189 inwardly and again outwardly at predetermined times to cause it to support and release a horizontal pin 199 (Fig. 3) carried by said frame 184 respectively to permit the same and the shank roller to be depressed as the shoe sole is presented and moved rearwardly and to prevent said link frame 184 from being depressed through the action of its spring 187 below a desired position when the jack and its shoe are depressed by its operating mechanism at the conclusion of the leveling operation and immediately preceding the stopping of the machine or the movement of said jack into shoe receiving position. By this arrangement, the bell crank 185 and the forepart form 23 connected therewith being adjusted for shoes of different sizes and styles will also cause a corresponding adjustment of the shank form 24 so that no additional mechanism is required for this purpose. The high part of the cam 197 (Fig. 3) is timed to permit the depression of said roller 198 simultaneously or immediately following the first rearward movement of the shoe by the action of the spring 187, so that the shank form 24 is immediately pressed into the depression at the rear of said forepart end to follow and mold the shank portion of the sole, and to raise said roller as said form is returned to its first position. These forms (see Figs. 3, 18 and 19) are adapted to be positively turned while they also slip back and forth over the sole with a rubbing progressive movement through the reciprocations of their carriers. Said forms furthermore being preferably mounted to rock freely on their carriers to adapt themselves to the contour of the sole and to be adjusted at a desired angle laterally across the same, each carrier (see Figs. 18 and 19) is provided with a horizontal rotary shaft 200 having a globular inner supporting end or universal bearing 201 (Fig. 19) provided with a split collar 202 on which a hollow cylindrical roll 203, which carries the form, is loosely mounted. To permit each form to swing longitudinally on its support so that it may automatically adapt itself to the transverse contour of the shoe sole as presented to it by the jack and to also rotate or oscillate said form, the collar 202 is provided with conical or inwardly tapering openings 204 to permit it to rock longitudinally on and relative to said globular head 201, and with upper and lower conical openings or slots 205 to receive the ends of a vertical cross pin 206, the cylindrical roll 203 also being provided with longitudinal slots for the same purpose. This pin extends diametrically through said globular head and is retained in position by a set screw 207, tapped into the end of said shaft 200, the ends of said pin engaging the sides of the slots in said cylindrical roll causing the latter to rotate with said shaft 200. That the form mounted on said cylindrical roll or drum 203 may be removably secured thereto to permit applying forms of different shapes or styles, and also to cause it to be rotated with said roll, the latter is provided at its inner end, the right Fig. 19, with longitudinal slots 208 to receive inwardly extending pins 209 secured in said form.

To provide suitable means for restricting the roll and its form to swing freely in a vertical plane while preventing it from oscillating freely horizontally or parallel to the plane of the shoe sole on which it vibrates, the inner end of said cylindrical roll 203 (Fig. 19) receives a square collar 210, arranged to slide vertically in a guide way 211 (Fig. 20), formed between depending arms 212 of a laterally curved or arc shaped block 213 (best shown in Fig. 18), dovetailed in cross section and constituting a slide that is adapted to be swung or adjusted laterally in a guide way of converse shape formed between a block 214 (Figs. 19 and 20), secured to the inner face of the form carrier, and an overhanging face or clamping plate 215, also secured to said carrier. This block 214, as herein shown (Fig. 19), is centrally provided with a circular aperture to permit it to receive said shaft 200 and to rotate freely therein. By adjusting this slide to a desired angle, the collar and the adjacent end of the form are correspondingly positioned across the sole, the form turning on its central pivotal bearing 201. To prevent the collar 210 from being displaced or falling out inwardly, the arms 212 are provided at their inner sides with inwardly projecting stops 216 (see Fig. 18 and dotted lines Fig. 20) and that said slide 213 and its collar may be locked when adjusted laterally to set the form at an oblique angle across and relative to the shoe sole, the face or clamping plate 215 is provided with set screws 217 which may be adjusted to lock the slide form at such angle. This arrangement provides a very convenient means for adapting or positioning the forms to operate upon rights or lefts or upon soles of different style.

To provide suitable means for positively turning or oscillating the shank form 24 simultaneously with its vibratory movement and as the shoe sole is progressively moved by the jack to present different portions of said sole to the molding action of said form, the rock shaft 200 is provided intermediate suitable bearings formed at the upper end of the depending vertical frame 182 (see Fig. 19) with a gear wheel 218, herein shown as pinned to said shaft. This gear wheel is meshed and oscillated by a vertical segmental gear 219 (Figs. 3 and 19) pivoted on a horizontal stud 220 at the front end of the carrier 170. To rock this segmental gear to oscillate the shank form as described, an upwardly extending arm of said gear is connected by a link 221 (Figs. 1 and 3) to the vertical arm of a bell crank 222, pivoted on said carrier 170, the vertical arm of which is in turn pivotally connected by a curved link 223 (Fig. 1) with a depending lug 224 at the rear end of said jack rocking guide arm 138. By this arrangement, the shank form is oscillated simultaneously with the rocking or progressive movements of the jack, so that the form is turned to present an appropriate mold face to a portion of the sole desired to be correspondingly shaped thereby. I have discovered that by the method of connecting said link 223 to said arm 138, more efficient movements and results are obtained than by connecting it to any other movable or vibratory part of the machine. The forepart form 23 is similarly mounted on its carrier 169, like parts being indicated by the same reference numerals, its oscillating segmental gear 225 (see Figs. 1, 3 and 18), however, being arranged horizontally and mounted on a rock shaft 226, suitably journaled in said carrier 169. This segmental gear 225 is oscillated through the movements of a horizontal rock arm 227, secured by its hub to the inner end of said shaft 226. The rear end of this rock arm 227 is provided with a roller or other stud 228 (Fig. 18) running in a groove formed at the outer side of a horizontal block 229 on said link 223, so that the vibrations of the latter are also transmitted to and to oscillate the forepart form 23. By thus oscillating both forms through rocking of the guide arm 138, which rocks the jack, the amount of oscillation of each form corresponds to that of the jack, which as described, is governed by the adjustment of said slide blocks 139, 140, according to the size of shoe operated upon.

Since the variations in the length of the different sizes of shoe soles is principally over the forepart thereof, suitable means are provided for varying the position of the forepart form 23 to move it toward or from the shank form 24 so that together they will vibrate over and cover every portion of the sole and will not vibrate off the toe and rear edge of said forepart. To this end the teeth of the segmental gear 177 referred to, upon which the stud 178 is supported, are in mesh with a similar gear 145$^x$ (Figs. 1 and 3) formed upon said sleeve 145, the rocking of which forwardly or rearwardly correspondingly moves the forepart form 23 toward or from said shank form. To provide convenient adjusting means for turning this sleeve 145 to vary the position of said form and to simultaneously adjust the position of said slide blocks 139 and 140 said sleeve is provided with a lever 230 having at its upper end a horizontal handle 231 (Figs. 1, 2 and 23) by which it may be conveniently moved, and immediately below which and sliding longitudinally on said lever is a spring pressed latch 232 having a transversely arranged projection or grip 233 underlying said handle, so that in grasping the latter the grip may be operated to raise or lower the latch. As herein shown, the lower end of this latch has a transversely arranged finger or latch proper 234, adapted to engage one of a series of notches 235 formed in the curved edge of a segment 236 (Fig. 1) secured in a central position on said pivot shaft 145$^a$ and the jack shaft 16, said notches corresponding to the different sizes of lasts and the corresponding sizes of shoes. By this construction a rocking sleeve 145 is associated with each jack and its associated forms, and it being desirable particularly in operating upon pairs, simultaneously to adjust each sleeve for a desired size, the sleeve 145 on the right pivot shaft 145$^a$ has a bent arm 237 (Fig. 2), the upper or front end of which is secured to a lug or boss 238 adjacent the upper end of said handled lever 230, so that in moving the latter to cause its latch to engage a desired size notch, the arm 237 is also adjustably moved with it. It being furthermore advantageous and often desirable to permit each of said sleeves 145 to be operated independently, so that one jack and its associated forms may be adjusted to operate upon one size of sole and the other upon a different size, the arm 237 may be disconnected and separately adjusted or, as shown in Fig. 23, the right sleeve 145 may be provided with an arm 230′ having a handle 231′ and locking mechanism similar in all respects or the duplicate of that provided for the lever 230, the segment, however, upon which the levers are adjusted and locked in desired size position, being wider so that the engaging ends of the latches 232 and 232′ may rest in the same notch 235 when the arms are adjusted to the same size of sole without interference one with another. It will be understood that in adjusting either of said sleeves 145 to a desired size position the leveling movement of the associated jack, the amount of oscillation of its forms, the relative adjustment of the forepart form and the position of the stops for limiting the downward movement of said forms is simultaneously and correspondingly adjusted.

In the present embodiment of my invention, the machine is adapted to level all of the different sizes of shoe soles at a uniform rate of speed, for instance, at a rate of one inch per second, more or less. Since this would enable the machine to complete its work on a short shoe in less time than upon a longer shoe, it becomes desirable also to vary the length of time in which the cycle of movement of the jack is completed in order that the cycle for a short shoe may be completed in proportionately less time than the cycle for a longer shoe.

Having described the means for varying the length of jack travel, I will now describe the means provided for governing or producing the required variation in speed, that is to say, the jack mechanism may be operated, say to complete its cycle in a shorter time for a short shoe but without varying the rate of leveling speed because the reduction in length or travel offsets the increase in speed of operation unless producing in all cases a uniform rate of leveling speed but occupying different periods of time according to the length of the shoe. To this end (see Figs. 1 and 3) the adjustable sleeve 145 is provided with a rearwardly projecting ear 239 to which is pivotally connected a vertical link 240 in turn pivotally connected at its upper end with the front arm of a horizontal lever 241 pivoted by its sleeve like hub 241' on a pivot shaft 242 (Figs. 2 and 3) supported by and between the rear edges of said side frame 1. At its rear end this lever 241 is connected with the upper end of the vertical sliding yoke frame 95 referred to. The yoke of this frame (see Figs. 3 and 7) is formed or carried at its lower end and is provided at its front face with a facing plate 243 (Fig. 3), said yoke and plate embracing a block 244 loosely mounted on the drive shaft 9 and by which the movements of the yoke frame are guided vertically as it is elevated or depressed by adjusting said sleeve 145 through its operating handle 231. At its lower end said yoke has a bearing for the friction disk 94 (Figs. 3 and 7) which is elevated or depressed with said frame 95, causing said disk respectively to run nearer to or farther from the edge of said disk 93 (Fig. 7). By this arrangement the friction disk 94 may be rotated faster or slower, as described, and as the latter transmits its motion to the disk 96, thence to the disks 97 and 102 respectively, the gear wheel 92 carried by the latter is correspondingly rotated, producing such variation in speed of leveling or rocking of the jack as may be required. By this construction the speed is adjusted by the sizing mechanism to offset the shorter stroke or travel of the jack adjusted by the same mechanism, so that one adjustment adjusts all the mechanisms as required to produce the desired uniform rate of leveling speed through different distances and in different times according to the size of sole operated upon. Thus my invention provides for the most economical operation by proportioning the time to the work, that is, the length of shoe to be operated upon, but without sacrifice of quality.

To further provide means for adjusting the speed so that the jack may be moved faster or slower, for example, independently of the length and time of jack travel as for producing a more or less thorough leveling action, and for varying the quality of work or as involved in operating upon shoes having different styles of soles, the front arm of the lever 241 has a curved slot 241ˣ (Fig. 3) so that the upper end of the link 240 may be pivoted farther away or nearer to the fulcrum of said lever, thereby varying the effective length of its front arm to increase or decrease the elevation or depression of said yoke frame 95 and correspondingly to vary the position of the disk 94 and the speed produced thereby. Thus my machine is not only provided with means for producing uniform work but with means also to vary the same as may be desired.

Having described the movements and adjustments of both the jacks and their associated forms, it remains to describe the mechanism which I prefer to employ for turning the jack and its shoe or changing its angular position as it is moved in and out by its positioning mechanism to facilitate placing and removing the shoes, also the mechanism for jacking and unjacking the shoe on the jack, and the novel construction and operation of the jack for regulating and supporting its last. In accordance therewith, the present embodiment of my invention is provided with the following mechanism for causing the jack and its last and the shoe thereon to be turned to present preferably the toe thereof inwardly, to bring it beneath the forepart form and to turn it outwardly more or less in moving the jack to shoe removing position, with the toe directed obliquely toward the operative, which position I have found to be most convenient for applying or removing the shoe.

It will be understood by those skilled in the art, that the rack containing the shoes to be leveled usually stands at the front and side of the machine and that in practice, the operative grasps a shoe on the rack and moves it toward the jack for mounting it thereon, hence by always placing a jack in the outer position described and especially by presenting it sidewise, it will be obvious that a great deal of time and labor is saved since it is not necessary to turn the shoe around or to change the position of the operative, the shoe being slipped upon the jack as a direct continuation of its movement from the rack.

Referring now particularly to Figs. 13 to 15, the upper face of said jack table 14 is here shown as provided with a longitudinal recess 245 (Figs. 14 and 21) which is dovetailed in cross section and forms a guide way to receive a rib 246 of converse shape formed upon the under side of said slide 13 and permitting the latter to be reciprocated back and forth for positioning the jack inwardly and outwardly as described. The upper face of this slide 13 is, in the present instance, counterbored or otherwise milled to provide suitable recesses (Fig. 14) for a horizontal pinion 247 journaled on a vertical stud 248 secured to said slide and having a larger pinion 249 below it secured to its hub and in mesh with the teeth of a vertical rack 250 (Figs. 14 and 15) secured longitudinally on said jack table 14 and which causes said pinion 249 to rotate as it runs back and forth thereon as the jack is moved by its positioning mechanism. At its outer side said slide 13 has a rearwardly extending lug 251 provided with a vertical stud 252 on which is pivoted a plate 253 carrying the jack. To its under side is secured, as by screws 254, a segmental gear 255 (best shown in Fig. 15) the hub 256 of which (see Fig. 14) is pivoted on said stud 252 between said slide 13 and the plate 253, said slide 13 being cut away or recessed at its side to receive and permit the gear to oscillate therein. The teeth of this gear are in mesh with the pinion 247 to be oscillated thereby as the slide is moved between its two positions.

Referring now to Fig. 15, it will be noted that as the left slide 13 moves to the left, carrying the pinions 247 and 249 with it, said pinion 249 is rotated by its engagement with the stationary rack 250, rotating said pinion 247 in the same direction and swinging said segmental gear 255 inwardly. The jack supporting plate 253 being secured by the screws 254 (indicated by dotted lines Fig. 15), by this movement of the gear is swung outwardly, so that as the slide reaches its outer position the jack plate 253 will occupy an outwardly oblique position corresponding to that shown at the right of Fig. 2. In the movement of said slide in the opposite direction, or toward the rear of the machine, said pinions and gear operate to swing the jack supporting plate inwardly or in the direction of the arrow shown adjacent the toe of the shoe on the right of Fig. 2. In the movement of said slide in the opposite direction, or toward the rear of the machine, said pinions and gear operate to swing the jack supporting plate inwardly or in the direction of the arrow shown adjacent the toe of the shoe on the right of Fig. 2, until it occupies a position corresponding to that shown by the shoe on the other jack at the left of Fig. 2 and from which it is raised by the elevating means to present the sole to the molding action of said forms. To limit the movement of the jack plate 253 as it is swung laterally by the movement of the jack slide into its longitudinal or leveling position, the left side of said slide 13 is provided with an upwardly projecting plate 13$^x$ (Fig. 15) constituting a stop to prevent further movement outwardly, the opposite side of said slide (see Figs. 6 and 15) having a pivoted dog 13$^a$ the foot of which normally rests upon the forked head 27 of said rocking lever 28 thereby depressing the rear end of said dog below the oscillatory path of said jack plate and permitting it to be swung toward and from said stop plate 13$^x$. The foot of this dog 13$^a$, however, is connected by a coiled spring 13' to said slide, so that as the jack table is elevated to present the jack to its forms and preparatory to the leveling movement thereof, the spring acts to depress said foot, elevating the rear end of the dog and bringing it into engagement with the side of said jack plate 253, thereby locking it laterally in place between it and said stop plate 13$^x$ and preventing oscillatory movement about its stud 252 during the subsequent leveling operation.

I will next describe the construction of the jack preferably employed in the particular embodiment of my invention herein illustrated and the means by which it is adapted to receive singly and to position, lasts of different sizes and styles to bring each to a predetermined position thereon and relative to the forms with which it is brought in leveling contact, which permits the use of the same forms upon soles widely different in size.

In adapting sole molding or leveling machines, as hitherto constructed, for operation upon shoes of the McKay type, they have usually been provided with a metallic last, preferably iron, to support the shoe to withstand the heavy pressure required in leveling and this obviously requires a different last for each of the different sizes and styles of shoes, which is a matter of large and serious expense. Furthermore, the position of the last must be shifted for every change in size or style of shoe to bring it and the shoe thereon into proper position relative to the molding means employed.

By my invention a machine is provided that obviates the objections to the use of iron or metallic lasts by employing a last that is much cheaper to produce and that is readily handled and positioned.

While in the particular embodiment of my invention herein illustrated I preferably provide a wooden last, yet any suitable material may be used. Such a last is not only intrinsically cheaper, but the shoe manufacturer may easily procure a set of such lasts corresponding to the large variety of sizes and styles of shoes to be operated upon, by increasing the order for the lasts used in lasting in adding thereto an order for similar or additional lasts to be used in the sole molding or leveling operation.

In the embodiment of my invention selected for description and illustration, I have shown a jack or last that is adapted not only for McKay shoes with the molding forms associated therewith and described, but also for work upon welt or other types of shoes for use with said forms, it being furthermore understood that my invention obviously is not limited to any particular type of molding means.

In carrying out this part of my invention for presenting the shoes as described, the rear of the jack supporting plate 253 (see Figs. 13 and 15) is provided with an interior shoe support comprising a last supporting base 257, preferably of iron, the head of which extends rearwardly to form a generous and continuous support for the body of a last 258 removably secured thereon. This base obviously may be formed or provided with means to support and hold any of the usual types of wooden lasts upon which shoes are lasted or placed or the iron ones used in the sole leveling or laying of McKay shoes. I have here shown an expansible last comprising a removable body of wood that may be conveniently provided and substituted for the varying changes of sizes or styles of shoes, the same being secured upon a metallic or other suitable base that will resist the heavy leveling pressure. Such a last and its support broadly are shown in my co-pending application, Serial No. 327,136, filed July 21, 1906. As here shown (see Fig. 13) the head of said base 257 is provided with a horizontal supporting face 259 and the last mounted thereon with a similar horizontal face 260 provided by cutting away the upper or angular portion of the usual last, so that it is preferably of relatively small extent vertically or in the direction of molding or leveling pressure permitting the full benefit of the underlying base to be received during the sole molding operation, that is to say, the height of the last is not sufficient to neutralize the rigidity afforded by the supporting base 257. The line of separation between the last and its base as herein is preferably shown as terminating at the base of the instep portion of the shoe at the broadest portion of the last, but said line may obviously be otherwise placed. By this construction, the base 259 underlies the greater portion of the body of the last and sufficiently to withstand the heavy pressure produced by the spring pressed leveling forms. Obviously the last 258 can be moved longitudinally over said base 257 or lasts of various sizes and styles may be secured in any desired relation thereon but it is found that the most efficient and favorable results are secured by bringing the last and the shoe mounted thereon to a predetermined position on said base whereby it may be also presented in invariable position to the molding forms which operate to level the sole of said shoe which is of considerable importance when an oscillatory form is employed, more particularly since it enables the same forms to be used on soles of different sizes, one or two sizes of molds being sufficient for all and thereby requiring the forms to be changed only when desirable to vary the style or shape of sole. In the present instance the curve or bend $x$ (Fig. 13) between the rear of the forepart of the sole and the shank is selected as the predetermined point referred to, though obviously any other point could be selected. By selecting the said rear edge of the forepart as predetermined part of the sole to be positioned predeterminately relative to the forms 23, 24, the latter may be operated to actually mold the line of separation between the forepart and shank of the sole and to move said forms and the shoe supporting jack to progressively mold and level the sole toward and from and on either side of said line of separation and continuously between the ball and breast line or heel of the shoe sole. That each of the various sizes and styles or shapes of lasts may be mounted on said base to bring said selected portion thereof to a predetermined position on the base and hence to make first contact at predetermined portions of said forms when presented thereto, each of said lasts is provided with an oblique pin socket 261 (see Fig. 13), directly beneath said bend $x$ or the rear edge of the forepart to receive an obliquely arranged pin 262 extending upwardly from and secured in the front portion of said base 257. By this arrangement the point $x$ of each last is brought into the same invariable position irrespective of the size or length of last employed and the socket 261 is located at the broadest and therefore strongest part of the last thereby tending to prevent splitting of the last when subjected to leveling pressure.

While any suitable means may be employed for locking the last upon the base, to prevent its tipping about the rear or front edge during the leveling operation, I have in the present instance, employed a spring pressed pin 263, arranged at an angle to said positioning pin 262 and sliding freely in a socket 264 formed in said base and an alined socket 265 formed in each of the lasts to be associated with it, its spring 266 normally acting to project the pin upwardly to cause it to enter and hold the last in the predetermined position referred to and on said base. The lower end of this pin extends downwardly through an opening in said base and is provided with a knob 263$^a$ by which it may be depressed or withdrawn from said socket 265 when it is desired to remove said last, or that another last may be placed thereon, in the latter case the positioning pin 262 first being socketed in the pin socket 261 of the last brought down upon the base, when the locking pin 264 is released to enter the socket 265.

The last 258, which is shown as associated with the base 257, may otherwise be of any desired shape or construction. As here shown, however, it is preferably cut away at the heel end to permit the heel end of the shoe to receive interiorly a coöperating vertical shoe positioning gage and support 267 constituting an expansible member of the interior shoe support and pivotally mounted on a depending arm of said jack plate 253. This gage is adapted to be moved longitudinally of the shoe to engage the shoe counter for engaging or positioning the heel end of the shoe and to also support said end thereby to firmly position and hold the shoe on the last. By thus providing relatively movable interior shoe supports, the jack is adapted to receive any of the usual sizes of lasts and the corresponding sizes of shoes and clamp the same in the predetermined position referred to. The mechanism for moving or adjusting this interior heel support will be best understood after describing the construction and adjustment of the toe rest or exterior shoe support now to be described, since the latter is operated by the same adjusting mechanism and coöperates with the heel support in positioning and jacking the shoe.

The described interior shoe support and any suitable means for operating it may be used with any desired type of molding means, my invention not being limited in this respect. Furthermore, this support may be used with or without an exterior support for the toe or forepart of the lasted shoe, but owing to the fact that the pressing required in leveling tends to break down the last, if not of metal, many advantages follow from the use of an exterior support. Consequently, in the particular embodiment of my invention herein illustrated, I have described an exterior toe support preferably one in which the toe contacting portion is adapted to automatically adjust itself to conform to the contour of the exterior portion of the toe so as preferably to present either a continuous support or at least, what in many instances is an equivalent, to a two point support. Other types of toe supports may, however, be employed but by preferably providing a support of this type the forepart of the shoe is sufficiently supported at the crown and toe end thereof, at least, to prevent the last breaking down when operated upon and to rigidly hold it in the desired predetermined position. As here shown (see Figs. 13 and 16), the rear portion of said jack supporting plate 253 is provided with a toe rest support and guide 268 for a vertically adjustable and swinging toe rest or saddle 269 of the continuous or two point supporting type, provided at its head with a removable pad 270 preferably provided with a cushion of yielding material and shape to receive the toe of the shoe thereon. That this pad 270 may be removably supported on its toe rest 269, the latter is provided with a groove or guide way 271 to receive a depending rib of the removable pad 270, the rest being provided with a set screw 272 (indicated in Figs. 14 and 16) to retain the pad therein.

In the particular embodiment of my invention herein selected for illustration, the toe rest 269 is adapted to rock or swing vertically so that it may automatically adapt itself to the shape of the forepart and toe of the boot or shoe presented thereto and to seat the same therein, and it is also provided with a vertically movable support so that it may be moved relative to the shoe sole or withdrawn from effective supporting relation therewith to provide suitable clearance to permit the shoe and its last to be removed from the base support 257 or to apply another shoe thereto.

That the toe rest may be mounted to swing or rock vertically, I preferably provide its under side with a hub 273 (Figs. 13 and 14), loosely mounted upon a short horizontal pivot shaft 274 secured at its ends in vertical slots or bearings 275 (see Fig. 16) in the upper ends of vertically extending arms 276 of a sustaining member 277, slidably mounted in vertical guideways 277* (Figs. 15—17) in said support 268. Said pivot shaft 274 is herein preferably provided with depending pins 278 (see Figs. 16 and 17) extending into vertical sockets in said uprights 276, against the bottom of which coiled springs 279 are seated and which act upon and to elevate said pins and their carrying shaft 274, said movement being permitted by the vertical slots 275 in said arm 276. When maintained by said springs in upper position, the toe rest and its pad swing freely on its supporting shaft so that it automatically adjusts itself to the contour or shape of the particular shoe sole presented to it and provide the two point or continuous support therefor. To provide suitable means for holding it in the position to which it automatically adjusts itself with the toe end of the shoe seated thereon, said hub 273 in the present instance is preferably provided with a depending arm 280 having a lower curvilinear serrated surface and which by the action of the shoe toe in seating itself upon said rest, is depressed thereby to engage a similar serrated surface 281 arranged beneath it upon said sustaining member 277. This sustaining and sliding member 277 is normally elevated by means of coiled springs 282, connecting horizontal pins 283 (Figs. 15 and 16) at the head of said support 268 with transversely arranged horizontal pins 284, secured in rearwardly extending ears 285 (Figs. 13 and 16) of said sustaining member 277. In operation these springs elevate the toe rest until it contacts the shoe toe which tends to prevent its further elevation, the toe of the shoe turning or swinging said rest to cause it to adjust itself to seat the toe at the two points referred to or continuously, while the sliding sustaining member 277 continues its upward movement to bring its serrated surface 281 into engagement with that on the depending arm 280 to lock the latter and said toe rest in adjusted or jacked position. To prevent this sustaining member 277 from being depressed by the toe of the shoe as it contacts the latter, or when the shoe sole is subjected to the pressing action of the form that vibrates over and upon it, the front edge of said sustaining member is provided with a vertical rack 286 (Figs. 16 and 17) against which two pivoted pawls 287 (Figs. 15 and 16) bear, one slightly less height than the other, so that said rack may be engaged by the active end of at least one of said pawls and held at the height to which it is elevated and adjusted by said springs 282. As here shown, these pawls are arranged side by side and are pivotally mounted at their lower ends on said jack supporting plate 253, each being also provided with a forwardly extending cam shaped arm 289 adapted to be engaged and depressed by a cam 290 fast on a horizontal jacking shaft 291, in turn journaled in upwardly extending ears or bearings 292 (see Figs. 13, 14 and 15) of said jack supporting plate 253. By turning this shaft in the direction of the arrow indicated upon Fig. 16, wherein the said pawls 287 are shown as holding the toe support in elevated or jacking position, the active face of said cam 290 will depress the cam arms 289 of said pawls and swing them forwardly to the position shown in Fig. 17, thereby unlocking or releasing the toe rest and permitting it to be either elevated or depressed. For adjusting the position of the interior heel supporting gage 267 said jacking shaft 291 is provided with a crank arm 293 connected by a link 294 with said heel gage support 267. At its lower end this heel gage support is pivotally mounted to oscillate back and forth on a stud 295 (Figs. 13 and 15) carried at the lower end of a depending arm 296 of said jack supporting table 253, which construction permits the heel supporting end of said support to swing longitudinally in the plane of the sole. When this jacking shaft is turned to permit the elevation or depression of the toe rest, the heel engaging end of said support 267 is simultaneously moved toward the counter or heel end of the shoe, or reversely, the desired movement for positioning the shoe being secured by moving it toward the heel to move the shoe rearwardly with it while its head also forms a heel support for the shoe thereby to firmly secure and support it upon said jack. The described movements of the heel support 267 and that of the rest 269 together jack the last and shoe in place to prevent movement thereof, during the leveling or molding operations. The rotary movements of the jacking shaft are secured by providing the sliding sustaining member 277, with a vertical rack 297, and said jacking shaft with a toothed cam 298 in mesh therewith, and rotated by the elevation of said rack to swing said link 294 and said heel support 267 rearwardly for positioning and clamping the shoe on said last, said rack being elevated of course by the action of said lifting springs 282.

That the rotation of the jacking shaft 291 may not be prevented by the contact of said heel support 267 with the counter of said shoe, when it has been moved sufficiently to jack the shoe in position thereon, a friction joint is provided between said link 294 and said heel support 267, herein shown as a curvilinear slot 299 (Fig. 13) to receive a horizontal pivot pin 300 carried at the front end of said link 294 and by which it is pivotally connected therewith. At its rear end said pin is respectively provided exteriorly (Figs. 2 and 15) with washers 301 and 302, the former bearing against the side of said pivoted support 267 and the latter retained at the end of said pin by clamping nuts 303, a coiled spring 304 surrounding said pin and interposed between said washers acting to clamp the washer 301, pin and heel support together sufficiently to cause the latter to move with said link pin and its carrying link until the support has engaged the shoe counter and positioned and clamped the boot or shoe on the last and also provided a heel support at the proper place. Further movement of the shoe being prevented, the movement of the support is arrested while permitting its operating link 294 to continue its motion by sliding relatively to said support. This arrangement also permits such further elevation of the toe rest as may be required to complete jacking the shoe as described, the tension of the spring 302 maintaining the heel support in its adjusted position and clamping the shoe in the predetermined position, referred to, relative to the jack and, inwardly also, to desired positions of the mold face of the forms at which the leveling action should commence. By adjusting the clamping nuts, the tension of the spring 304 may be varied to vary the amount of friction at said friction joint to regulate the slipping between the movable parts so that the force with which the shoe is clamped may also be suitably controlled.

For locking the toe rest and its pad in elevated and adjusted position after seating the toe of the shoe thereon, said jacking shaft 291 (see Figs. 16 and 17) is provided with the loosely mounted toothed cam 298 which as described is in mesh with the teeth of said rack 297 and is rotated thereby upon elevation of the sustaining member 277 by its springs 282. When rotated in the opposite direction a notch in the edge of said cam 298 is turned to a position to be engaged by the active end of a pawl 309 secured on a short rock shaft 308 journaled in vertical ears of said jack plate 253, said cam being thereby prevented from turning so as to permit the sustaining member 277 to rise. By this arrangement the toe rest may be locked in depressed position as it is withdrawn from sustaining relation with the shoe thus providing suitable clearance to permit the shoe to be removed or another applied. To raise this pawl 309 to unlock the cam 298 so that it may again be rotated in jacking the shoe, the rock shaft 308 is provided with a second pawl 309' also secured to said shaft and a little longer than the pawl 309, its upper end being curved or otherwise formed to be engaged and lifted by a cam 305 fast on said jack shaft 291, and which is turned by rotating said shaft to bring its active face to engage and lift the pawl 309'. This movement rocks said rock shaft 308 to elevate the active end of said pawl 309 thereby to release the toothed cam 298.
That the toothed cam 298 may be operatively connected with the shaft 291 so that it may act to rotate or turn the same when it is itself rotated by the elevation of the sustaining member, to permit of such movement, and also that it may be rotated to depress or elevate said sustaining member as may be desired, it is connected to said cam 305 with a provision for lost motion to permit the cam first to be turned to operate the pawls to release the cam 298. This provision for lost motion is secured by providing the side of the cam 305 with a laterally extending pin 306 received in a curvilinear slot 307 of said toothed cam 298, which permits the cam 305 and its shaft to be rotated slightly before the pin contacts with the end of the slot to move the toothed cam with it. By this arrangement, when the toe rest is raised to engage the shoe, said pin 306 rests at the right end of said slot 307 (see Fig. 17) preventing the cam 298 from turning in a direction to permit elevation of said toe rest thereby locking the latter in depressed position. When, however, the jacking shaft 291 is turned to the left (Fig. 17), said cam 305 is rotated with it, the pin and slot connection permitting the pin to slide in said slot 307 with consequent lost motion between said cams 298 and 305 before the former is rotated thereby. Simultaneously the active or high part of said cam 290 is turned to bear upon and depress the cam ends 298 of the pawls 287, thereby to swing their rack engaging ends inward to release the sustaining member 277 and permitting its depression when the toothed cam 298 is rotated to depress said rack 297 and the sustaining member and toe rest connected therewith.

Any suitable mechanism may be employed for rotating this jacking shaft 291 to turn its cam and respectively to operate the pawls 287, 309 and 309' for unlocking said shaft, thereby to permit said springs 282 to act to rotate said shaft and effect a preliminary jacking of the shoe. In the present instance, however, I prefer to use the following mechanism: At its outer end said jacking shaft 291 is provided with a crank arm 310, which as the jack moves from the inner position shown in Fig. 15 to the outer shoe receiving or removing position, engages a horizontal arm 311 of a sleeve 312 loosely mounted upon said stud 252. As shown in Fig. 14, the lower portion of this sleeve is cut away at one side, leaving an approximately semi-circular, arc-shaped yoke embracing said stud and provided with a laterally extending tooth or projection 313, adapted to engage a notch 314 of converse shape formed at the base of a similar upwardly projecting arc-shaped yoke 315 of a sleeve 316, fast on said stud 252 and on which the said sleeve 312 is supported. The opposed edges of said yokes are cut away to provide sufficient clearance to permit the sleeve 312 to oscillate with lost motion before said tooth 313 is brought into engagement with said notch 314, to lock said sleeve 312 against rotation in the same direction and also to permit it to be unlocked and turned out of engagement therewith to permit it to elevate or depress for a purpose presently made clear. This sleeve 312 is otherwise loosely mounted on said stud 252 and as just stated is also adapted to be moved vertically when said tooth is not in engagement with said notch. A coiled spring 317, surrounding said stud and interposed between said sleeve 312 and a washer at the head of said stud, normally acts to depress or hold said sleeve in its lower position, but which yields to permit its elevation.

As the jack shaft arm 310 engages the horizontal arm 311 of said sleeve 312 (Fig. 16) as the jack is moved outwardly, or to the left (Figs. 14 and 15) said sleeve 312 is turned to the left, to cause it to lock with the sleeve 315 thereby preventing it from being elevated and from further rotation and causing said jack shaft arm 310 to be swung to the left and to pass under said arm 311 or from the position indicated in Fig. 16 to that shown in Figs. 15 and 17 and simultaneously rotating said shaft and its cams until the depression or notch in said toothed cam 297 is engaged by its retaining pawl 309 to lock it to prevent reverse movement thereof. By the rotation of the jacking shaft 291 in this direction, the pawls 287 release the toe rest sustaining member 277 and then said cam 298 by its engagement with the rack 297 operates to depress said toe rest into its unjacked position as indicated in Fig. 17.

When the jack is moved from its shoe receiving position in which a new shoe has been applied thereto and jacked, to bring the jacking mechanism into the position indicated in Fig. 16 but with the cam arm 310 in the position indicated in Fig. 17, the horizontal cam arm 311 does not operate to turn the crank arm 310 of said jacking shaft since it is essential to maintain the said arm elevated in the jacking position and with the shoe jacked. To this end the outer or front edge of said horizontal cam arm 311 (see Figs. 15 and 16) is inclined downwardly and rearwardly so that as the upwardly extending crank arm 310 of said jack shaft in its jacking position engages therewith as the jack is moved into leveling position, it will have a wedge action thereon and operate first to turn said arm and the sleeve upon which it is formed, first to unlock the same and then to elevate it against the tension of its depressing spring 317 sufficiently to permit the actuating crank arm 310 to slide rearwardly under it to and maintaining the position indicated in Fig. 15, when said sleeve 312 and its cam arm 311 are again depressed by its spring into operating position on the front side of said cam arm 310, so that in the next outward movement of the jack it will again operate to turn the shaft and unjack the shoe. By this arrangement the shoe is unjacked as the jack is moved outwardly, which permits the shoe to be easily removed and another to be applied, the jacking mechanism then being in position to be operated to jack the new shoe firmly in place. In the present instance, this shaft, its cams and said arm 310 are adapted to be turned by a crank arm 318, arranged at right angles to said arm 310 and, as shown in Fig. 17, turned into an upper position as the jack is moved outwardly, said arm having a crank pin 319 at its outer end to facilitate operating it and to be engaged by an operating device now to be described. This crank arm 318 may be operated by hand to turn the jacking shaft and release the spring actuated sustaining member to permit it, by its elevation, to position the toe rest and also to turn said shaft 291 thereby to actuate the said interior heel support or gage 267 thus to jack the shoe in the predetermined position referred to or the crank arm may be further turned to more firmly jack the shoe after the springs have automatically jacked said shoe. I have found it more desirable and advantageous, however, to employ as herein shown suitable treadle means, comprising a vertically swinging upright or link 320 pivotally mounted at its lower end on a treadle 321 (see Figs. 2 and 21), in turn pivotally mounted by its hubbed rear end on a short horizontal rock shaft 322, suitably journaled at the base of a vertical bracket 323 secured by its arms to said side frame 1 and extending forwardly in front of the machine. This vertical link 320 is provided with a hock shaped head 324 under which said crank pin 319 slides as the jack is moved into its shoe removing and receiving position. The rock shafts 322 at the right and left sides of the machine respectively (Fig. 2) are arranged obliquely so that the treadles will extend obliquely inward to present their treads in juxtaposition to the tread 72 of the main operating treadle 71 at the center of the machine for convenience in operating them. It being further desirable that each treadle should be on the right of the center line of the shoe, the left treadle 321 (Fig. 2) is provided at its rear end with a hub which is secured to its rock shaft 322, the outer end of which, exterior to its bearing in said bracket 323, is provided with a rock arm 325, supporting the pivoted hook carrying upright link 320. At its upper end, said bracket is provided with a forwardly projecting arm 326 having a curvilinear slot 327 to receive a horizontal pin of said link 320 and operating to direct the vertical movement of the latter and prevent its hook shaped end from having sufficient lateral motion to disengage the crank pin 319 when the jack is in outer position. For normally holding the hook shaped end of the right link 320 in elevated position to permit said crank pin and its arm to slide under it, said bracket is provided with a coiled spring 329, connecting it with said treadle 321 and acting to lift said treadle and through it the link and its hook shaped end. Similarly the left link 320 is provided with a similar coiled spring connecting the bracket with the link 325, on which said link 320 is mounted.

In operating either of said crank arms 318, it and the mechanism connected therewith being in the position indicated in Fig. 17 and the jack in outer position with the hook overlying its crank pin 319, a depression of the treadle causes said hook, said pin and its arm 318, to swing to the left (Fig. 17) swinging said jacking shaft 291 to the left, thereby rotating said cam 305 to the left to lift said pawl 309' and thereby said pawl 309 to release the toothed cam 298, the lost motion between these cams provided by the slot 306 and pin 307 referred to, permitting of such action.

As the toothed cam 298 is released the coiled springs 282 operate to lift the toe pad into engagement with the toe of the lasted shoe to automatically seat the same on said pad as described, and simultaneously rotating said cam 298 to cause it to actuate the interior heel support 267 until the latter engages the counter of the shoe which prevents further movement thereof, the friction joint between said heel gage support 267 and its actuating link 294 permitting further slide of said link relative thereto and rotation of said cam so that the vertical movement of the toe pad is not necessarily limited thereby. The frictional engagement, however, between said link and the heel support 267 is sufficient to maintain the latter in the shoe engaging position to which it has been moved. As the lasted shoe is firmly seated upon its toe pad and the heel support is moved rearwardly to provide an interior support at the heel end of the sole and to yieldingly hold the lasted shoe in place thereon and relative to said toe rest, the shoe is firmly jacked in position by the engagement of the serrated face of said toe rest depending arm 280 with that of the sustaining member 277, the pawls 287 engaging the vertical rack 286 thereon and holding the rest and its pad in adjusted position, and, through the engagement of the vertical rack 297 with the cam 298 preventing rotation thereof and movement of said link 294 so that the interior heel support is also yieldingly locked in position. The treadle may, however, if desired, be further depressed to coöperate with said springs 282 to produce further rotation of said jacking shaft 291 and complete the jacking operation by which the shoe is firmly clamped in the predetermined molding position, referred to. This construction leaves both hands of the operative free for use elsewhere or to assist in positioning the shoe after applying it to the jack and affords a very convenient operative controlled means for jacking the shoe, the unjacking thereof being automatically performed by the machine as the jack is moved outwardly at the conclusion of the leveling operation described.

My machine is operated as follows: The operative first applies the desired type of form to the cylindrical rolls 203, upon which they are removably secured and then moves the operating handle 231 over the notched segment 236 to adjust the position of said forms and regulate their movements for a desired size of shoe or sole, this adjustment as has been stated also varying the speed of said forms and the limits of rocking movement thereof. He then applies an appropriate last to the base on which it is to be supported and locks it in place thereon and applies a shoe to the jack. He next depresses the jacking treadle to release the jacking shaft permitting it to rotate to swing the interior heel support rearwardly and the toe pad automatically to rise and seat the toe of the shoe thereon and then to jack the last and its shoe in position as described. The shoe is now ready for leveling, and, assuming the driving shafts to be in constant rotation, to move the shoe into inner position and to raise it into leveling position relative to the forms, the main operating treadle is depressed, which as described rotates the star wheel to cause a depression of the front end of the clutch actuating lever 62, releasing the tripping lever 53, the bell crank 58, and actuating the clutch to start the jack positioning mechanism. Upon conclusion of a half rotation of said trip lever 53, it again engages and operates said bell crank 58 to stop the jack positioning mechanism which has already been sufficiently described. Simultaneously the engagement of the cam lug 124 of said trip lever 53, with the upright rock arm 122 rocks the latter to elevate the horizontal pawl carrying arm 119 of the rock shaft 61 (Figs. 5 and 7) thereby turning the ratchet 117 and its connected cam to operate the clutch member or yoke lever 104 to slide the friction wheel 102 outwardly to run on the constantly rotating speed disk 97 and thereby produce rotation of the gear wheel 92 and the double cam gear wheel 89 referred to (Fig. 6). The rotation of this gear wheel 89 first causes the elevation of the jack as described to bring it in leveling contact with the forms and then rocks the same longitudinally to produce the desired progressive movements of the jack and its leveling form.

As the jacked shoe is elevated its toe is brought to bear against the forepart form and the point $x$ between the shank and forepart of the sole is brought to bear upon the shank form, the elevating stop of the shank form being displaced simultaneously to permit it to move down to meet the shank of the sole. The shoe is now simultaneously moved rearwardly by the jack rocking mechanism while the forms are continuously vibrated over the bottom of the sole and its shank and also simultaneously turned or progressed on their axes, respectively to present appropriate forepart and shank shaping mold faces to the portions of the sole to be correspondingly shaped thereby, until the shoe is again rocked into its initial leveling position with the forms bearing upon their initial points of contact. During these movements pressure is automatically maintained between the jack and its associate forms by means of the depressing springs 187. Immediately upon reaching this initial position at the conclusion of the leveling operation, the jack is automatically depressed below said forms by the action of the cam slide 22 and the shank form stop is placed to prevent said form from following the shoe, and the gear wheel roller 146 simultaneously operates to lift the lever 148 and rock the bell crank 150 to stop the rotation of said gear wheel 89. Simultaneously said bell crank 150 operates to turn the star wheel to its initial operating position with the roller at the front end of the yoke-shaped clutch actuating lever 62 positioned between two adjacent teeth of said star wheel, so that a subsequent depression of the treadle may again actuate the clutch to start the positioning mechanism. This leaves the lasted and leveled shoe in a depressed position beneath the forms with the other or left jack in an outer position ready to receive a shoe thereon. If another, say a left shoe is to be leveled, the operative will have in the meantime applied and jacked a shoe upon the left jack, and he will now again depress the main operating treadle 71 to cause the left side of the machine to operate as just described, at the commencement of which, however, the right jack is moved from its inner position outwardly and turned obliquely around to present the leveled shoe sidewise in the position indicated at the right of Fig. 2 in which the shoe may most conveniently be removed therefrom and another applied.

By my invention, a novel sole laying and leveling machine is produced which is easily managed and controlled by but a single operative, the only labor required of him being to place each shoe upon the jack as the machine automatically presents a jack into outer and convenient position to facilitate the application and removal of shoes therefrom, to depress the treadles for jacking such shoe on its jack and for starting the machine automatically to move the jacked shoe into leveling position in contact with the leveling forms to level the forepart and shank of the shoe sole and to again withdraw the jack to its shoe removing position or to leave it depressed in inner central position as desired.

By my invention a machine is provided that I believe is the first in the art to level or operate upon shoe bottoms at a uniform rate so that the cycle of movement or the time of operation is proportionate to the size or length of shoe thus to economize the time expended in operating with a saving of expense. This feature is one of considerable importance as is also the additional speed adjusting means which permit of variation in the rate of operation and in the quality of work done.

By my invention also, a machine is produced that, so far as I am aware, is the first to provide rubbing progressive forms contradistinguished from rolling progressive formers to operate not only upon the forepart but also upon the shank of a shoe sole, and acting to maintain a perfect balance between said parts both longitudinally and transversely. It is, therefore, possible to give either a conformation that positively molds a clearly defined line of separation between the forepart and shank and also to continue the molding action continuously to the breast line longitudinally between the ball and heel. I believe I am the first also, to provide a machine of the progressive leveling type, in which the relative positions of a jack and a molding form, of a jack and two forms, and of the forms to each other are adjustable.

My machine is the first shoe bottom operating machine wherein the jack as moved outwardly is partially turned to change its direction for the more convenient manipulation of shoes and also to permit the shoes to be more easily jacked in the sidewise position of the jack. The provision of treadle means for operating the jacking mechanism for the first time also leaves the two hands of the operative free for use elsewhere requiring little or no time or attention on the part of the operative for jacking and a saving of time, money and expense results.

In the particular embodiment of my invention herein illustrated and described, I have disclosed specific and novel types of forms and also new types of coöperating jacks to present the shoes to the desired predetermined positions relative to said forms, but my invention obviously is not limited in this respect, as it not only contemplates the employment of said forms with other types of jacks but the use also of the specific jack here shown with other types of molding tools or means, the terms "molding means" or "leveling tools" or "formers" being herein and hereafter employed in a generic sense.

By the provision of a twin or duplex machine, the number of operatives required is reduced with a consequent reduction in the expense of leveling.

While in the particular embodiment of my invention herein selected for illustration I have described a twin machine, obviously my invention is not limited thereto nor to the specific operating mechanism and terms employed, the latter being used in a broad or general sense and not in their specific nature, and I would have it understood that my invention is not limited to the exact construction and arrangement herein shown and described but that minor changes and alterations may be made within the spirit and scope of my invention.

Having thus described my invention, what I claim as new and desire to secure by Letters Patent is:—

1. An organized machine of the type described comprising in combination a former, a shoe supporting jack, means for producing relative progressive movement between them, means for moving said jack into or out of position for said progressive movement and for producing relative vertical movement of said former and jack to bring the shoe into operative contact with said former at the commencement of progressive movement of said jack and for depressing it out of contact therewith at the conclusion of said movement.

2. An organized machine of the type described comprising in combination a former, a shoe supporting jack, means for producing longitudinal movement thereof to effect laying or leveling of the sole of a shoe mounted on said jack, means for moving said jack into and out of position beneath said former and for elevating said jack to bring said sole into contact with said former.

3. An organized machine of the type described comprising in combination a vibrating former, a shoe supporting jack, machine means for producing longitudinal movement of said jack to effect laying or leveling the sole of a shoe mounted thereon, means for moving said jack into and out of position beneath and for elevating said jack to bring said sole into operative contact with said former at the commencement of the leveling movement of said jack and for depressing it out of contact therewith at the conclusion of said movement.

4. An organized machine of the type described comprising in combination a former, a shoe supporting jack, means for producing variable longitudinal movement of said jack adapted to effect laying or leveling the sole of different sizes or styles of shoes to be mounted on said jack, means for moving said jack into and out of position beneath said former and for elevating said jack to bring said sole into operative contact with said former at the commencement of the leveling movement of said jack and for depressing it out of contact therewith at the conclusion of said movement.

5. An organized machine of the type described comprising in combination a vibrating former, a shoe supporting jack, means for producing relative progressive movements between said vibrating former and jack to effect leveling of the shoe sole mounted on the latter, and means for moving said jack into and out of position beneath said former and for elevating said jack to bring said sole into operative contact with said former at the commencement of the leveling movement of said jack and for depressing it out of contact therewith at the conclusion of said movement.

6. An organized machine of the type described comprising in combination a vibrating former, a shoe supporting jack, means for producing relative progressive movements between said vibrating former and jack to effect leveling of the shoe sole mounted on said jack, means for varying said movements to correspond to different sizes or styles of soles, and means for moving said jack into and out of position beneath said former and for elevating said jack to bring said sole into operative contact with said former at the commencement of the leveling movement of said jack and for depressing it out of contact therewith at the conclusion of said movement.

7. A machine of the type described comprising in combination a vibratory former, a shoe supporting jack, and means operating automatically upon starting the machine to present said jack to the former to permit the latter to operate upon the sole of a shoe mounted on said jack and to depress said jack at the conclusion of said operation and return it into a convenient shoe removing position.

8. A machine of the type described comprising in combination a plurality of shoe supporting jacks, vibratory formers having circumferentially patterned peripheries associated therewith, means operable on starting the machine for automatically presenting said jacks to their formers and for independently and subsequently producing relative progressive movements of said jacks and their formers and means for vibrating the formers during such progressive movement.

9. A machine of the type described comprising in combination a plurality of shoe supporting jacks, vibratory formers having circumferentially patterned peripheries associated therewith, and means operable in starting the machine for automatically presenting said jacks to their formers, means for independently and subsequently producing relative progressive movements of said jacks and their formers, said means being actuated by the jack presenting means and means for vibrating the formers.

10. A machine of the type described comprising in combination a plurality of shoe supporting jacks, vibratory formers associated with each jack, means operable in starting the machine for automatically and successively presenting each jack to its formers, and means set in operation thereby for producing relative progressive movements between said jack and its formers.

11. A machine of the type described comprising in combination a plurality of shoe supporting jacks, vibratory formers associated therewith, means operable in starting the machine for automatically and successively presenting each jack to its former, means set in operation thereby for producing relative progressive movements of said jack and its former, and means connected with the progressive moving means to again actuate the jack presenting means to cause the withdrawal of said jack to an outer shoe removing position.

12. A machine of the type described comprising in combination sole molding means, a shoe supporting jack movable into and out of molding position relative to said means, shaft mechanism for relatively imparting back and forth movements between said jack and said molding means to level the sole of a shoe mounted on said jack, and means operated automatically by the movement of said jack to molding position for actuating said mechanism.

13. A machine of the type described comprising in combination leveling tools, a shoe supporting jack movable into and out of leveling position relative to said tools, shaft mechanism for imparting a back and forth movement to the jack and said tools in leveling the sole of a shoe mounted on said jack, and means operated automatically by the movement of said jack to leveling position for actuating said jack moving mechanism.

14. A machine of the type described comprising in combination leveling tools, a shoe supporting jack movable into and out of leveling position relative to said tools, shaft mechanism for imparting a back and forth movement to the jack to coöperate with said tools in leveling the sole of a shoe mounted on said jack, means operated automatically by the movement of said jack to leveling position for actuating said jack moving mechanism, and means operable at the conclusion of a predetermined number of back and forth movements to stop the same.

15. A machine of the type described comprising in combination leveling tools, a shoe supporting jack movable into and out of leveling position relative to said tools, shaft mechanisms for imparting a back and forth movement to the jack to coöperate with said tools in leveling the sole of a shoe mounted on said jack, means operated automatically by the movement of said jack to leveling position for actuating said jack moving means, and means operable at the conclusion of said back and forth movement to stop the same and also to withdraw said jack into shoe removing position.

16. A machine of the type described comprising in combination a plurality of shoe supporting jacks, vibratory formers associated therewith, means for relatively and progressively moving said jacks and formers to coöperate with the vibratory movements of the latter to shape the soles of shoes mounted on said jacks, means operable in starting the machine for automatically presenting said jacks to their formers and for actuating the means for relatively moving said jacks and formers, and means for vibrating the formers during the progressive movement of the jacks and formers.

17. A machine of the type described comprising in combination a plurality of shoe supporting jacks, vibratory formers associated therewith, means for relatively and progressively moving said jacks and formers to coöperate with the vibratory movements of the latter to mold the soles of shoes mounted on said jacks, means operating in starting the machine for automatically presenting said jacks to their formers and actuating the means for relatively moving said jacks and formers, and to withdraw said jacks at the conclusion of said progressive movements into convenient shoe removing positions, and means for vibrating the formers during said progressive movement.

18. A machine of the type described comprising in combination a former, a driving shaft, a shoe supporting jack, jack oscillating means adapted to be operatively connected with said driving shaft, and means operable in starting the machine for presenting said jack to said former and to operatively connect said oscillatory means with said shaft to rock said jack.

19. A machine of the type described comprising in combination a former, a driving shaft, a shoe supporting jack, jack oscillating means constructed and arranged to be operatively connected with said driving shaft, and means operable in starting the machine for presenting said jack to said former and to operatively connect said oscillatory means with said shaft to rock said jack a predetermined number of times in leveling contact with said former and for also disconnecting said oscillating means at the conclusion thereof.

20. A machine of the type described comprising in combination sole molding means, a shoe supporting jack, means for moving it from shoe applying to an inner position beneath said molding means, and means for raising said jack to present the sole of a shoe mounted thereon to the action of said molding means and for producing relative progressive movement between said means and said jack.

21. A machine of the type described comprising in combination sole pressing means, a jack, and means for moving it from an outer shoe applying or removing position inwardly beneath said sole pressing means and turning it to present a shoe sole mounted thereon in operative position relative to said molding means.

22. A machine of the type described comprising in combination a forepart former, a shank former, a jack, and means for moving it from an outer shoe applying or removing position inwardly beneath said formers and turning it to present a shoe sole mounted thereon in operative position relative to said formers.

23. A machine of the type described comprising in combination sole pressing means, a jack, and means for moving it from an inner position beneath said sole pressing means to an outer shoe removing position and turning it to direct the innermost end more or less outward to facilitate the removal and application of shoes.

24. A machine of the type described comprising in combination sole pressing means, a jack, and means for moving it from an inner position beneath said sole pressing means to an outer shoe removing position and turning it to present a side thereof more or less to the operative.

25. A machine of the type described comprising in combination sole molding means, a shoe supporting jack provided with means for moving it toward and from said molding means, and jack turning means operated by the movements of said jack to swing an end thereof inwardly beneath said molding means when moved toward it or outwardly when moved from it.

26. A machine of the type described comprising in combination sole pressing means, a shoe support, and means for producing relative operating movement between them and a lateral turning movement of the shoe support independently thereof and additional thereto.

27. A machine of the type described comprising in combination sole pressing means, a shoe support, and means for producing relative operating movement between them and a lateral movement of the shoe support other than said operating movement.

28. A machine of the type described comprising in combination sole molding means, a shoe supporting jack provided with means for moving it toward or from said molding means, and jack turning means operated by the movements of said jack for swinging an end thereof inwardly beneath said molding means when moving toward said molding means or outwardly when moving from said means, said jack turning means comprising a rack, a pinion rotated thereby and a segmental gear connected with said jack and operated from said pinion.

29. A machine of the type described comprising in combination means for molding a shoe sole, a jack to support a shoe, means for moving the jack from shoe receiving to an inner position beneath said molding means, means for raising the jack to bring a shoe sole into operative contact with said molding means and means for moving the jack back and forth while the sole is in contact therewith.

30. A machine of the type described comprising in combination means for molding a shoe sole, a jack to support a shoe, means for moving the jack from shoe receiving to an inner position beneath said molding means, means for raising the jack to bring a shoe sole into operative contact with said molding means, means for moving the jack back and forth while the sole is in contact with said molding means, and for vibrating said molding means to mold and burnish said sole.

31. A machine of the type described comprising in combination a form for molding a shoe sole, a jack to support a shoe, means for moving the jack from shoe receiving to an inner position beneath said form, means for raising the jack to bring a shoe sole into operative contact with said form and for moving the jack back and forth while the sole is in contact therewith, means for vibrating said form to mold and burnish said sole, and means for simultaneously turning said form back and forth to present an appropriate mold face thereof to the part of the sole operated upon and presented by the movement of said jack, for correspondingly molding said sole.

32. A machine of the type described comprising in combination molding means, a jack, means relatively to move the same and said molding means for the performance of work, and means also to move the jack laterally and transversely for presentation to the operative.

33. A machine of the type described comprising in combination molding means, a jack, means relatively to move the same and said molding means for the performance of work, means to move the jack outwardly at the conclusion of the working operation, and means also to move the same laterally and transversely for presentation to the operative as it is moved outwardly.

34. A machine of the type described comprising in combination a pair of jacks, vibratory forms associated therewith having vibratory means for operating them, means for successively moving said jacks inwardly and outwardly respectively to present them to their forms and to a convenient outer position to facilitate the removal from or application of shoes to said jacks and presenting one jack in inner position while the other is in shoe removing position, means for producing relative progressive movements between said jacks and said associated forms, and means operated thereby for stopping the machine with one jack in shoe removing position and the other in inner position.

35. A machine of the type described comprising in combination a shank form having a circumferentially patterned periphery, a jack adapted to receive a shoe, means for producing relative longitudinal and progressive movement between said jack and said form, and means simultaneously to bodily vibrate said form and to oscillate the same on its axis to present an appropriate patterned portion thereof to a corresponding part of the sole operated upon and presented thereto through said progressive movements.

36. A machine of the type described comprising in combination, a former having a circumferentially patterned periphery, a shoe supporting jack, means for producing relative longitudinal movement of said jack and former, means relatively to vibrate said former and jack, and means relatively to vary the rate of travel of said former and jack.

37. A machine of the type described comprising in combination, a former having a circumferentially patterned periphery, a shoe supporting jack, means for producing relative longitudinal movement of said jack and former, means relatively to vibrate said former and jack, means to controllably oscillate the former on its axis to present patterned surface portions thereof to corresponding portions of the shoe sole and means relatively and simultaneously to vary both rate and length of travel of said former and jack.

38. A machine of the type described comprising in combination, a former having a circumferentially patterned periphery, a shoe supporting jack, means for producing longitudinal movement of said jack relative to said former, means for vibrating said former over the jack, means to controllably oscillate the former on its axis as it is vibrated to present patterned surface portions thereof to corresponding portions of the shoe sole, and means simultaneously to vary the travel and speed of said former and jack.

39. A machine of the type described comprising in combination an oscillatory form having a patterned periphery extending circumferentially and longitudinally thereof and adapted by its oscillations to mold a shoe sole longitudinally and laterally, means for oscillating said form upon its axis to present patterned surface portions thereof to corresponding portions of the shoe sole and also vibrating the same for progressively molding a shoe sole presented thereto, and means for adjusting the position of said form to correspond to the size or style of shoe to be operated upon.

40. A machine of the type described comprising in combination an oscillatory form having a patterned periphery extending circumferentially and longitudinally thereof and adapted by its oscillations to mold a shoe sole longitudinally and laterally, means for controllably oscillating said form on its axis and also vibrating the same for progressively molding a shoe sole presented thereto, and means for adjusting the position of said form and the amount of oscillation to correspond to the size or style to be operated upon.

41. A machine of the type described comprising in combination an oscillatory form having a patterned periphery extending circumferentially thereof and adapted by its oscillations to mold a shoe sole, means for controllably oscillating said form on its axis to present patterned portions thereof to corresponding portions of the shoe sole and also vibrating the same for producing attritive action upon a shoe sole presented thereto, and size adjusting means for said form.

42. A machine of the type described comprising in combination an oscillatory form having a patterned periphery extending circumferentially thereof and adapted by its oscillations to mold a shoe sole longitudinally, means for controllably oscillating said form on its axis to present patterned portions thereof to corresponding portions of the shoe sole and also vibrating the same for producing attritive action upon a shoe sole presented thereto, size adjusting means for said form, and speed adjusting means controlled thereby.

43. A machine of the type described comprising in combination an oscillatory form having a patterned periphery extending circumferentially thereof and adapted by its oscillations to mold a shoe sole, means for oscillating said form to present patterned portions of the form to corresponding portions of the shoe sole and also vibrating the same for producing attritive action upon a shoe sole presented thereto, means for adjusting the position of said form and the amount of oscillation to correspond to the size of shoe to be operated upon, and speed adjusting means connected with the latter.

44. A machine of the type described comprising in combination a vibratory form having a patterned periphery extending circumferentially thereof, means to vibrate said patterned form, a shoe supporting jack, means for producing relative progressive movements between them, and means for obliquely positioning said form in a plane approximately parallel to the sole face and securing it in said position for operating upon rights or lefts or soles of different styles.

45. In a machine of the type described, the combination with a shoe support of a form having a patterned periphery extending circumferentially thereof and conforming to the general contour of the shoe sole, means for adjusting said patterned form in a horizontal plane to an oblique or angular position relative to a sole mounted on said support and means for securing it in adjusted position.

46. A machine of the type described comprising in combination a shoe supporting jack, a forepart former, a shank former said formers having a patterned periphery extending circumferentially thereof in substantial conformation of the sole contour and adjusting means for positioning each in an oblique position across the sole of a shoe mounted on said jack.

47. A machine of the type described comprising in combination a shoe supporting jack, a forepart former, a shank former said formers having a patterned periphery extending circumferentially thereof in substantial conformation of the sole contour, adjusting means for positioning each in an oblique position across the sole of a shoe mounted on said jack, and means to permit lateral rocking of said formers for automatic adaptation of said formers to the sole operated upon.

48. A machine of the type described comprising in combination a shoe supporting jack, a forepart former, a shank former said formers having a patterned periphery extending circumferentially thereof in substantial conformation of the sole contour, adjusting means for positioning each in an oblique position across the sole of a shoe mounted on said jack, means to permit lateral rocking of said formers for automatic adaptation of said formers to the sole operated upon, and carrier means for said formers to permit each to swing vertically thereby to follow the contour of the sole part operated upon.

49. In a machine of the type described the combination of a supporting jack, a former provided with a bearing extending thereinto and constructed and arranged to support said former intermediate its ends to permit universal movement thereof to vary its position with respect to a shoe sole on said jack.

50. In a machine of the type described, the combination of a shoe support, a working device coöperating therewith and having a movement about a bearing constructed and arranged to support said device intermediate its ends to permit universal movement thereof to vary the position of said device with respect to a shoe sole on said support.

51. In a machine of the type described the combination of a work support, a former provided with an axial recess and a bearing extending into said recess for supporting said former having means to permit universal tipping or swinging of said former thereon to vary the position of the former with relation to the work on the said support.

52. In a machine of the type described the combination of a work support, a former carrier, a bearing shaft connected therewith having a globular head, a former having an axial recess to receive said head and means for mounting said former thereon intermediate its ends to permit of universal swiveling movement thereof and means for relatively moving the former and work support.

53. In a machine of the type described, a former carrier, a bearing shaft connected therewith having a globular head, a former having an axial recess to receive said head, means for mounting said former thereon intermediate its ends to permit of universal swiveling movement thereof, and means intermediate said carrier and said former to restrict said swiveling movement to a desired vertical plane.

54. In a machine of the type described a form provided with an axial recess, and a bearing extending into said recess for supporting said form having means to permit universal tipping or swinging of said form thereon, and means for oscillating said form to vary the active face of the form in molding contact with the sole of a shoe presented thereto.

55. In a machine of the type described the combination of a shoe support, a carrier, and a former co-acting with said shoe support and having a longitudinal recess for removably securing it on said carrier.

56. In a machine of the type described, a carrier, a rock shaft journaled thereon provided with a pinion, a form secured to said shaft, a segmental gear in mesh with said pinion, and means for oscillating said gear and its pinion to rock said shaft and the form mounted thereon.

57. In a machine of the type described, a carrier, a rock shaft journaled thereon provided with a pinion, a form secured to said shaft, a segmental gear in mesh with said pinion and means for oscillating said gear and its pinion to rock said shaft and the form mounted thereon, and means for bodily vibrating said carrier and form back and forth as the form is rocked on its axis.

58. A machine of the type described comprising in combination a former, a carrier therefor constructed and arranged to swing vertically, a movable stop for limiting the vertical swing thereof, means for moving said former, and adjusting means for varying the position of said former longitudinally and of said stop vertically according to the size or style of sole to be operated upon.

59. A machine of the type described, comprising a shoe supporting jack, a shank former, a carrier therefor arranged to swing vertically, means for presenting said jack to said former, means for producing relative longitudinal movement between said former and jack, a movable stop normally to limit the downward swing of the former carrier, and machine means for displacing said stop to permit said former to engage and follow the shank of a shoe sole for operating thereon.

60. A machine of the type described comprising in combination, a shoe supporting jack, a shank former for molding the shank of a shoe mounted on said jack, a carrier therefor arranged to swing vertically, a stop to limit the vertical depression of said former carrier, means for presenting said jack to said former and for depressing said jack at the conclusion of the molding operation, and means for displacing said stop to permit said former to contact with and follow the shank of a sole when the jack is presented to said former and to again replace it to limit the depression of said former as the jack is depressed.

61. In a machine of the type described, molding means arranged to swing vertically, a stop for limiting said movement and means for periodically displacing said stop.

62. A machine of the type described comprising in combination an oscillatory forepart form, an oscillatory shank form, said forms having a circumferentially patterned periphery and means simultaneously to oscillate and reciprocate them to produce attritive action between corresponding portions of the forms and sole.

63. A machine of the type described comprising in combination an oscillatory forepart form, an oscillatory shank form said forms having a patterned periphery extending circumferentially thereof, means simultaneously to oscillate and reciprocate them to produce attritive action between corresponding portions of the forms and sole, and means for adjusting them relatively for operating upon soles of different sizes or styles.

64. A machine of the type described comprising in combination an oscillatory forepart form, an oscillatory shank form said forms each having a patterned portion extending circumferentially about the same, means simultaneously to oscillate and reciprocate them to produce attritive action between corresponding portions of the forms and sole, and means for varying their relative travel when operating upon soles of different sizes or styles.

65. A machine of the type described comprising an oscillatory forepart form said forms each having a circumferentially patterned periphery, an oscillatory shank form, common means for oscillating them to present different patterned portions to corresponding portions of the shoe sole and means independent thereof for reciprocating the same simultaneously with said oscillatory movements.

66. In a machine of the type described, a shank leveling form having a patterned periphery extending circumferentially thereof to shape the sole of a shoe from the rear of the forepart toward the heel, means for mounting said form to permit it to rock vertically to adapt itself to the sole operated upon, and means for oscillating said form for progressively and correspondingly shaping the shank of a shoe sole presented thereto.

67. In a machine of the type described, a shank leveling form having a patterned periphery extending circumferentially thereof corresponding to and adapted to shape the sole of a shoe from the rear of the forepart toward the heel, means for mounting said form to permit it to rock vertically to adapt itself to the sole operated upon, and means for securing it at a desired horizontally inclined or oblique position across said sole for operating upon rights or lefts or different sizes and styles of shoe soles presented to said form.

68. In a machine of the type described, a cylindrical roll shaped form provided with a patterned periphery extending circumferentially thereof to shape the sole of a shoe, means for mounting the same to adapt it to rock laterally for seating itself upon the sole operated upon, and means for positively oscillating said form to correspondingly shape a shoe sole presented thereto.

69. In a machine of the type described, a sole molding form, means for vibrating it and to alternately rotate the same in opposite directions about an axis substantially parallel to the sole face to be leveled, and means for adjusting the position of said axis in a horizontal plane for operating upon rights and lefts or different styles and sizes of shoe soles singly presented thereto.

70. A machine of the type described comprising in combination a vibratory shank form and means for vibrating it, a shoe supporting jack having means for producing a forward and back progressive movement thereof relative to said form, and machine means to give the active mold face of said form a rotary progressive movement over said sole in one direction during the forward movement of said jack and in the opposite direction during the return or backward movement of said jack to bring an active face of the form adapted to the portion of the sole operated upon in leveling contact therewith.

71. A machine of the type described comprising in combination a jack, a form coöperating therewith, means to move the jack from shoe receiving to leveling position and vice versa, means operable with the jack in shoe receiving position to effect jacking of a shoe mounted thereon, means operating automatically with the movement of said jack from leveling to shoe receiving position to unjack the same.

72. In a machine of the type described, the combination of leveling means, a jack coöperating therewith and provided with drive shaft means to move it from leveling to shoe receiving position, and means operable during the movement of the jack from leveling to receiving position to automatically unjack the shoe mounted on said jack.

73. A machine of the type described comprising in combination a jack, leveling means coöperating therewith, means to move the jack from leveling to shoe receiving position, means for jacking a shoe upon said jack in said position, a treadle to control said means, and means operable in moving the jack into shoe receiving position for connecting said jacking means and said treadle.

74. A machine of the type described comprising in combination a pair of jacks and their associated formers, means for relatively moving the formers and jacks lengthwise of the work during the leveling operation, a driving shaft and connected mechanisms for moving the jacks from an outer shoe receiving position inwardly to present them successively or alternately to said associated forms, and for moving said jacks into outer shoe receiving position, a treadle and connected mechanism adapted by a single depression to actuate connected mechanisms to level a single jacked shoe, and to thereafter stop the machine with said jacked shoe in inner position and the jack without a shoe in shoe receiving position and by a double depression of said treadle to level a pair of shoes in succession and stop the machine with said jacks and their shoes in corresponding positions, one in and the other out.

75. In a machine of the type described, a pair of jacks and their associated formers, a driving shaft and connected mechanisms for relatively progressing the formers and jacks in a direction lengthwise of the work in the leveling movements of said jacks and formers for leveling the soles of shoes mounted on said jacks, and a treadle and means connected therewith for controlling said connected mechanism to level a single shoe or a pair as may be desired.

76. In a machine of the type described, a pair of jacks and their associated formers, a driving shaft and connected mechanisms for producing leveling movements of said jacks and formers for leveling the soles of shoes mounted on said jacks, and a treadle and means connected therewith for controlling said connected mechanisms to level a single shoe or a pair as may be desired, and comprising a star wheel 69, ratchet wheels, 70, and 161, for moving it, a shield 162, connected with the latter and adapted to cover the teeth of said ratchet 70, lever and pawl mechanisms for operating said ratchets and star wheel, and a roller and clutch actuating lever adapted to be elevated and depressed by the movements of said star wheel.

77. In a machine of the type described, the combination of a form, a pivoted guideway 15, a jack support 13, mounted to slide vertically therein, a cam slide 22, and connected mechanism for elevating and depressing said support, and means for oscillating said pivoted guideway thereby to rock the jack support mounted therein with relation to the form.

78. A machine of the type described comprising in combination leveling means a table provided with longitudinal guideways, a slide to reciprocate therein having a jack supported thereon, shaft means to reciprocate said slide, a pivoted guide in which said table is mounted to slide vertically, means for elevating and depressing said table to raise or lower the jack with respect to the leveling means, and means operable with the table in elevated position for oscillating said pivoted guide thereby to rock the jack connected therewith.

79. In a machine of the type described a form, a table provided with longitudinal guideways, a slide to reciprocate therein having a jack supported thereon to coöperate with said form, shaft means to reciprocate said slide, a pivoted guide in which said table is mounted to slide vertically, means for elevating and depressing said table to move the jack toward and from the form, means operable with the table in elevated position for producing a single oscillation of said guide to rock the jack connected therewith, and means operated thereby and at the conclusion of said oscillation to actuate said elevating and depressing means to depress said table and its jack and also to stop the machine.

80. In a machine of the type described, a form, a jack provided with means for moving it from outer to inner position and simultaneously turning it, means to maintain said inner position and means for producing leveling movements between the jack and form.

81. A machine of the type described comprising in combination molding means, an interior shoe support having a last base, a last adapted to be secured thereon with a part intermediate the ends of the last in invariable position for predetermined molding contact with said molding means regardless of the size of said last, front and rear positioning and locking means for jacking a shoe on said support in said invariable position, means for producing relative motion between said support and molding means for causing said molding contact and to thereafter separate them one from another.

82. In a machine of the type described, the combination of molding means, a jack provided with movable shoe supports with means for moving them singly to bring a predetermined part of shoes of different sizes to the same invariable molding position, and means for presenting the jack with its shoe to the action of said molding means and for withdrawal thereof.

In testimony whereof, I have signed my name to this specification, in the presence of two subscribing witnesses.

ERASTUS WOODWARD.

Witnesses:
SIDNEY F. SMITH,
HARRY T. McCLURE.